United States Patent
Duru

(10) Patent No.: US 10,464,671 B2
(45) Date of Patent: *Nov. 5, 2019

(54) PERSONAL FLIGHT VEHICLE

(71) Applicant: 4525612 CANADA INC., Brossard (CA)

(72) Inventor: Catalin Alexandru Duru, Brossard (CA)

(73) Assignee: 4525612 CANADA INC., Brossard (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/259,574

(22) Filed: Jan. 28, 2019

(65) Prior Publication Data
US 2019/0152602 A1    May 23, 2019

Related U.S. Application Data

(63) Continuation of application No. 15/110,335, filed as application No. PCT/CA2015/050005 on Jan. 6, 2015, now Pat. No. 10,239,615.

(30) Foreign Application Priority Data

Jan. 7, 2014 (CA) ...................................... 2838535
Mar. 5, 2014 (CA) ...................................... 2844721

(51) Int. Cl.
*B64C 27/20* (2006.01)
*B64C 39/02* (2006.01)
(Continued)

(52) U.S. Cl.
CPC ............ *B64C 39/026* (2013.01); *B64C 15/12* (2013.01); *B64C 27/20* (2013.01); *B64D 27/04* (2013.01);
(Continued)

(58) Field of Classification Search
CPC ....... B64C 15/12; B64C 27/20; B64C 39/026; B64D 2027/026; B64D 27/04; B64D 27/24; B64D 31/04
See application file for complete search history.

(56) References Cited

U.S. PATENT DOCUMENTS

| 294,316 A | 2/1884 | Graves et al. |
| 2,417,896 A * | 3/1947 | Zimmerman ......... B64C 39/026 |
| | | 244/17.15 |

(Continued)

FOREIGN PATENT DOCUMENTS

| CA | 1 226 257 A | 9/1987 |
| CA | 2 187 678 A1 | 4/1998 |

(Continued)

OTHER PUBLICATIONS

International Search Report and Written Opinion for Application No. PCT/CA2015/050005, dated Mar. 9, 2015.
(Continued)

*Primary Examiner* — Justin M Benedik
(74) *Attorney, Agent, or Firm* — Marshall, Gerstein & Borun LLP

(57) ABSTRACT

A personal flight vehicle including a platform base assembly that provides a surface upon which the feet of an otherwise free-standing person are positionable, and including a plurality of axial flow propulsion systems positioned about a periphery of the platform base assembly. The propulsion systems generate a thrust flow in a direction substantially perpendicular to the surface of the platform base assembly, where the thrust flow is unobstructed by the platform base assembly. The thrust flow has a sufficient intensity to provide vertical takeoff and landing, flight, hovering and locomotion maneuvers. The vehicle allows the pilot to control the spatial orientation of the platform base assembly by the movement, preferably direct, of at least part of his or her body, and the spatial movement of the vehicle is thus controlled.

28 Claims, 22 Drawing Sheets

(51) Int. Cl.
  *B64D 31/04* (2006.01)
  *B64C 15/12* (2006.01)
  *B64D 27/04* (2006.01)
  *B64D 27/24* (2006.01)
  *B64D 27/02* (2006.01)

(52) U.S. Cl.
  CPC ............ *B64D 27/24* (2013.01); *B64D 31/04* (2013.01); *B64D 2027/026* (2013.01)

(56) References Cited

U.S. PATENT DOCUMENTS

| | | | |
|---|---|---|---|
| 2,937,827 A | | 5/1960 | Duce |
| 2,943,816 A | | 7/1960 | Hiller, Jr. |
| 2,953,321 A | * | 9/1960 | Robertson ............ B64C 39/026 180/117 |
| 3,149,798 A | | 9/1964 | Moore |
| 3,165,280 A | | 1/1965 | Lee |
| RE26,756 E | * | 1/1970 | Moore et al. ......... B64C 39/026 244/4 R |
| 3,559,922 A | * | 2/1971 | Gluhareff ............. B64C 39/026 244/17.17 |
| 4,037,683 A | | 7/1977 | LeBell |
| 5,779,188 A | * | 7/1998 | Frick .................... B64C 39/026 244/12.5 |
| 5,954,479 A | | 9/1999 | Smith |
| 6,164,590 A | | 12/2000 | Kusic |
| 6,488,232 B2 | * | 12/2002 | Moshier ................ B64C 39/026 244/4 A |
| 6,745,977 B1 | | 6/2004 | Long et al. |
| 6,796,396 B2 | * | 9/2004 | Kamen .................. A63C 17/12 180/272 |
| 6,874,728 B2 | * | 4/2005 | Lau ........................ B64C 15/02 244/4 A |
| 7,097,134 B1 | * | 8/2006 | Blum ....................... A63C 5/11 244/4 A |
| 7,258,301 B2 | * | 8/2007 | Li .......................... A63B 35/00 244/4 A |
| 7,484,687 B2 | | 2/2009 | Martin |
| 7,581,608 B2 | | 9/2009 | St. Louis |
| 8,408,488 B2 | * | 4/2013 | Leaver ................... B64C 27/20 244/12.2 |
| 8,608,104 B2 | | 12/2013 | Zapata |
| 8,651,432 B2 | | 2/2014 | De Roche |
| 8,698,104 B2 | | 4/2014 | Weaver et al. |
| 9,776,718 B2 | * | 10/2017 | Homer .................. B64C 39/026 |
| 9,849,980 B2 | * | 12/2017 | Li ......................... B64C 39/026 |
| 2005/0178879 A1 | | 8/2005 | Mao |
| 2007/0034738 A1 | | 2/2007 | Sanders et al. |
| 2007/0290097 A1 | | 12/2007 | Ishiba |
| 2008/0054121 A1 | | 3/2008 | Yoeli |
| 2008/0283673 A1 | | 11/2008 | Yoeli |
| 2009/0140102 A1 | | 6/2009 | Yoeli |
| 2009/0159757 A1 | | 6/2009 | Yoeli |
| 2010/0051740 A1 | | 3/2010 | Yoeli |
| 2011/0049307 A1 | | 3/2011 | Yoeli |
| 2011/0168834 A1 | * | 7/2011 | Yoeli ..................... B64C 1/1415 244/12.3 |
| 2012/0032032 A1 | * | 2/2012 | De Roche ............... B64C 27/20 244/221 |
| 2012/0080564 A1 | | 4/2012 | Yoeli |
| 2013/0068895 A1 | * | 3/2013 | Zapata .................. B64C 39/026 244/23 A |

FOREIGN PATENT DOCUMENTS

| | | |
|---|---|---|
| CN | 102020020 A | 4/2011 |
| CN | 202464125 U | 10/2012 |
| DE | 102011082719 A1 | 3/2013 |
| EP | 0 457 710 A2 | 11/1991 |
| EP | 1 901 153 A1 | 3/2008 |
| EP | 2 354 796 A1 | 8/2011 |
| ES | 2354796 A1 | 3/2011 |
| FR | 2 982 922 A1 | 5/2013 |
| GB | 2 419 122 A | 4/2006 |
| GB | 2 460 441 A | 12/2009 |
| GB | 2498406 A | 7/2013 |
| IL | 175265 A | 5/2012 |
| JP | 2007-509790 A | 4/2007 |
| RU | 2 062 246 C1 | 6/1996 |
| WO | WO-2005/039972 A2 | 5/2005 |
| WO | WO-2006/112578 A1 | 10/2006 |
| WO | WO-2012/113158 A1 | 8/2012 |

OTHER PUBLICATIONS

International Preliminary Report on Patentability for Application No. PCT/CA2015/050005, dated May 16, 2016.

* cited by examiner

PERSONAL FLIGHT VEHICLE

CROSS REFERENCE TO RELATED APPLICATION

This application is a continuation of U.S. patent application Ser. No. 15/110,335 filed on Jul. 7, 2016, which is a national phase entry of PCT Patent Application No. PCT/CA2015/050005 filed Jan. 6, 2015, which claims the priority benefit of Canadian Patent Application No. 2,838,535 filed Jan. 7, 2014 and Canadian Patent Application No. 2,844,721 filed Mar. 5, 2014, the specifications of each of which are hereby expressly incorporated by reference in their entireties herein.

TECHNICAL FIELD OF THE INVENTION

The present invention pertains to ultra-light aircrafts, particularly ultra-light aircrafts with Vertical Takeoff and Landing (VTOL), as well as to those with hovering capacity. More particularly, the present invention relates to a personal flight vehicle. In addition, it also refers to the manufacturing processes for building ultra-light aircrafts of the invention, and to various corresponding uses and the learning methods for said uses.

BACKGROUND

Various ultra-light aircrafts with vertical takeoff and landing, such as helicopters, are widely recognized as methods for human transportation. Typically, such vehicles have their propulsion systems located over the centers of mass of both the pilot and that of the aircraft, providing stability and enabling a simple landing. These aircrafts are typically controlled through handles, pedals or joysticks. Other types of VTOL vehicles have multiple rotors within a solid frame, and the various methods of controlling such aircrafts are described in the following patents.

U.S. Pat. No. 2,937,827, published on Jul. 24, 1960, describes an airframe and power plant combination in an aircraft capable of taking off and landing vertically, and capable of sustained flight in the vertical or any other attitude, where the danger normally attendant on failure of one of the engines has been eliminated.

U.S. Pat. No. 294,316A, published on Jul. 5, 1960, relates to high-speed aircrafts capable of vertical takeoff and landing operations.

US2953321A, published on Sep. 20, 1960, generally relates to ways and means for propelling a person through the air in controlled flight. More particularly, the invention provides a wing-less aircraft that is propelled by thrust reactions and is capable of vertical ascent for takeoff and climbing, air hover, horizontal flight, and vertical descent under conditions such that directional control and transition from vertical to horizontal flight, and vice versa, are performed by the bodily movements or the balance of the pilot flying the machine.

CA-A-1 226 257, published on Sep. 1, 1987, describes a fuselage that includes front and rear ends, opposite sides, as well as top and bottom sections. A pair of laterally-spaced, front-to-rear, and elongated support structures are sustained from opposite sides of the fuselage, where the front and rear ends of the support structures extend forward and rearward of the fuselage. A pair of front and rear tubular wings are supported in an oscillatory manner between the front and rear ends of the support structures, forward and rearward of the fuselage; they achieve angular displacement about axes that extend between the corresponding ends of the support structures, and are positioned approximately along diametric planes of the tubular wings.

CA-A-2 187 678, published on Apr. 11, 1998, describes an improvement to the sporting apparatus known as the snowboard. This hoverboard applies air-cushioned technology to snowboards. The hoverboard contains a power source, an air blower and a sport board platform modified to maintain an air cushion. The structure of the board is designed so that the board glides over a said air cushion. As a result, the speed and maneuverability of the snowboard are significantly increased.

RU 2 062 246, published on Jun. 20, 1996, describes an unmanned flying vehicle wherein two counter-rotating rotors are positioned within a toroidal fuselage and in which solely rotor pitch is utilized to generate required lift, pitch, roll, yaw, vibration and stress control for the vehicle.

RU 2 062 246, published on Jun. 20, 1996, describes a VTOL aircraft that comprises round or oval fuselage with a convex top surface, a flat bottom surface and a central part that extends downward whereat the cabin with control system and power plant is arranged. Fuselage has four annular openings to accommodate four airscrews aiding it to be turned from the horizontal plane into the vertical plane. Two vertical airscrews are arranged at fuselage front and rear to reverse from a vertical plane to a horizontal plane. All airscrews feature pitch varying both jointly and separately, and are driven by two engines via transmission. The aircraft is equipped with a hydraulic system, robot pilot, rescue parachute, observation system, and emergent solid engines, resulting in high maneuverability and safety.

U.S. Pat. No. 5,954,479, published on Sep. 21, 1999, describes a coaxial, dually-propelled propulsion system with twin engines that employ a unique transmission and have two independent drive trains. The first of the two engines exclusively drives a first drive train, which in turn rotates a forward, multi-bladed propeller assembly. The second engine exclusively drives a second drive train, which in turn rotates an aft multi-bladed propeller assembly. Therefore, although coaxial, the propellers of this system are driven by separate engines. The propulsion system benefits from the increased propulsive efficiency of a coaxial dual-propeller design, as the first drive train rotates the forward propeller assembly in a certain rotational direction and the second drive train rotates the aft propeller assembly in the opposite direction. Furthermore, the propulsion system employs pitch-change control mechanisms that independently control the respective pitch of the blades of each propeller assembly.

U.S. Pat. No. 6,164,590, published on Dec. 26, 2000, describes a variable bodied helicopter. The helicopter is of a type having tandem lifting rotors (1, 2) with a body consisting of a front section (3) and a rear section (4). The rear section of the body is narrower than the front section of the body, thereby allowing the rear section to travel into the front section. Channeled railings (5, 6) attached to the front section of the body firmly hold the rear section through railings (7, 8) attached to the rear section, thus guiding the movement of the rear section relative to the front section. A shaft consisting of two sections (9, 10) is used to synchronize the tandem arranged rotors. The narrower section (9) of the shaft slides into the wider section (10) of the shaft when the rear section of the body moves into the front section of the body. Bearings (1 1, 12, 13) support the synchronizing shaft. One bearing (13) is firmly fixed to the front section of the body (3) while another bearing (12) is attached to the rear section (4) but is linked to the front section, thus causing it to move against the rear section when the rear section moves relative to the front section. Another bearing (1 1) positioned on the rear section (4) is linked by a telescopic connection (14) to the front section of the body so that it is placed at the optimum position on the rear section as the body expands from a compressed state.

U.S. Pat. No. 6,745,977, published on Jun. 8, 2004, describes a vehicle that is in the general shape of a land vehicle, such as a car, but has a plurality of rotors enabling the vehicle to fly in the manner of a VTOL or a helicopter. The vehicle has foot pedals and steering that can be operated in the manner similar to that of an automobile.

WO2005039972(A2), published on May 6, 2005, describes a vehicle including a fuselage having both a longitudinal and a transversal axis; two ducted, fanned, lift-producing propellers carried by the fuselage on each side of the transversal axis; a pilot's compartment formed in the fuselage between the lift-producing propellers and, significantly, aligned with one side of the fuselage; a payload bay formed in the fuselage between the lift-producing propellers, and opposite the pilot's compartment; and two pusher fans located at the rear of the vehicle. Many variations are described enabling the vehicle to be used not only as a VTOL vehicle, but also as a multi-function utility vehicle for performing many diverse functions including hovercraft and ATV functions. Also described are an unmanned version of the vehicle and the unique features applicable in any single or multiple ducted fans and VTOL vehicles.

US-A-2005/178 879, published on Aug. 18, 2005, describes a tail-sitter VTOL vehicle with two pairs of propellers mounted respectively on left wing and right wing, and top and bottom vertical tail stabilizers. The wing propellers and tail propellers spin in opposite directions. Full altitude control is realized in all flight phases through differential powering of the four propellers, coordinated by an electronic control system. The four propellers, together, generate sufficient thrust to counter gravity in hover mode, while the wings provide aerodynamic lift for efficient forward flight.

GB-A-2 419 122, published on Apr. 19, 2006, describes an aircraft that contains an airframe portion comprising means for supporting a pilot and defining a central axis, as well as a rotor-head comprised of at least two rotors arranged to rotate about their respective axes displaced from the central axis of the aircraft. Several different types of aircraft are disclosed and several different aspects are independently claimed. In one aspect, the rotor head is able to pivot about an axis 1216 perpendicular to the central axis of the aircraft. In another aspect, the rotors are in respective planes that are inclined to define a non-zero dihedral angle. In a further aspect, an explosively-deployed parachute, rotor brake, and means for signaling an emergency are provided. In a still further aspect, a lift-providing aerofoil portion (eg. 2712) is stipulated, which may be varying in the angle of attack. Single-passenger aircrafts in which the pilot is either standing or seated are disclosed, as well as multi-passenger aircrafts. The aircrafts may comprise ducted rotors, or open rotors having variable pitch blades. Mechanical or fly-by-wire control systems may be used.

WO2006/1 12578, published on Oct. 26, 2006, illustrates a vertical take-off and landing (VTOL) aircraft, including a body (120), two or more rotary units (130) coupled to said body, each having a rotating shaft (131), a blade (135), and a casing (201) covering both the body and the rotary units, and being provided with openings (201 a). The casing (201) may be formed into a duct shape with an opening to receive the rotary unit therein, or may be provided with a sidewall (203) to surround the blade. Each opening (201 a) may have a protective means (207). The reaction torques of the rotary units can balance each other without requiring a separate balancing device. The casing covers the blades, thus preventing the generation of unbalanced lift on the rotating blades, unlike in conventional helicopters, in cases when the VTOL aircraft flies forwards. Furthermore, because the rotary units are prevented from coming into contact with outside articles, the aircraft prevents the damage of the rotary units and damage to outside articles. Due to a structural feature of the casing, the thrust to propel the VTOL aircraft can be increased by about 10~15%. Furthermore, a rudder (301) is provided in the casing, thus allowing the VTOL aircraft to yaw freely or fly forwards and backwards according to the orientation of the rudder.

JP 2007/509790, published on Apr. 19, 2007, describes a vehicle including a fuselage having a longitudinal axis and a transversal axis; two ducted, fanned, lift-producing propellers carried by the fuselage on each side of the transversal axis; a pilot's compartment formed in the fuselage between the lift-producing propellers and, significantly, aligned with one side of the fuselage; a payload bay formed in the fuselage between the lift-producing propellers and opposite from the pilot's compartment; and two pusher fans located at the rear of the vehicle. Many variations are described, enabling the vehicle to be used not only as a VTOL vehicle, but also as a multi-function utility vehicle for performing many diverse functions, including hovercraft and ATV functions. Also described is an unmanned version of the vehicle. Further defined are unique features applicable in any single or multiple ducted fans and VTOL vehicles.

US-A-2008054121, published on Mar. 6, 2008, describes a VTOL vehicle comprising a fuselage having forward and aft propulsion units, each propulsion unit comprising a propeller located within an open-ended duct wall wherein a forward-facing portion of the duct wall or at least the forward propulsion unit is comprised of at least one curved, forward barrier mounted for horizontal sliding movement to open the forward-facing portion, thereby permitting air to flow into the forward-facing portion when the VTOL vehicle is in forward flight.

EP 1901 153 A1, published on Mar. 19, 2008, relates to an autonomous miniature multi- or quadrotor helicopter. Conventional algorithms for autonomous control use ideal models with the centre of gravity (CG) in the origin of the body fixed coordinate frame. In-flight payload droppings or construction of miniaturized aerial vehicles may cause problems, e.g. because sensors cannot be mounted perfectly in the CG or because the CG is shifted out of the origin of the initially assumed body fixed coordinate system. The consequences are additional accelerations and velocities perceived by the sensors so that these effects have to be covered by the control system. This paper describes the modelling of the dynamic behaviour with respect to variable CGs and control aspects of a quadrotor helicopter.

US-A-2008/283 673, published on Nov. 20, 2008, describes a vehicle including a fuselage having a longitudinal axis and a transversal axis; two ducted, fanned, lift-producing propellers carried by the fuselage on each side of the transversal axis; and a body formed in the fuselage between the lift-producing propellers. Many variations are described enabling deflection and affection of flow streams, as well as reduction of drag and momentum drag which improve speed and the forward-flight of the vehicle. Further described are unique features applicable in any single or multiple ducted fans and VTOL vehicles.

US-A-2009/140102, published on Jun. 4, 2009, describes a vehicle, including a vehicle frame; a duct carried by the vehicle frame with the longitudinal axis of the duct perpendicular to the longitudinal axis of the vehicle frame; a propeller mounted in a rotating manner within the duct about the longitudinal axis of the duct, so as to force an ambient fluid from its inlet at the upper end of the duct through its exit at the lower end of the duct, thereby producing an upward lift force applied to the vehicle; and a plurality of parallel, spaced vanes, pivotally mounted to and across the inlet end of the duct about pivotal axes perpendicular to the longitudinal axis of the duct and, markedly, parallel to the longitudinal axis of the vehicle frame, where the vanes are selectively pivotal about their axes to produce a desired horizontal force component to the lift force applied to the vehicle.

US-A-2009/159757, published on Jun. 25, 2009, describes a vehicle including a fuselage having a longitudinal axis and a transversal axis; two ducted, fanned, lift-producing propellers carried by the fuselage on each side of the transversal axis; and a body formed in the fuselage between the lift-producing propellers. Many variations are described, each enabling deflection and affection of flow streams, and reduction of drag and momentum drag, thus improving the speed and forward flight of the vehicle. Further described are unique features applicable to any single or multiple ducted fans and VTOL vehicles.

GB-A-2 460 441, published on Dec. 2, 2009, describes a flying machine (1) comprised of at least two motor-driven, vertically-axed, contra-rotating propellers (5, 7). A seat (15) and handlebars (21) may both be mounted on the machine (1) above the propellers (5, 7), at positions radially inward of the outer periphery of the propellers (5, 7); a hub (33) may extend below the propellers (5, 7) and below the lowermost part of the machine (1). The handlebars (21) may be movably mounted on the machine (1) above the propellers (5, 7), where movement of the handlebars (21) in use controls the yaw of the machine and/or the collective pitch control of the propellers (5, 7). The machine (1) may comprise a yaw control mechanism such that a characteristic of one propeller (5) may be varied relative to the other (7) in order to induce a torque reaction to cause the machine (1) to yaw.

US-A-2010/051740, published on Mar. 4, 2010, describes a VTOL vehicle including a forward rotor, an aft rotor and a fuselage, the forward and aft rotor lying in the longitudinal axis of the vehicle, with the fuselage located axially between the forward and aft rotors. The vehicle has an in-flight configuration wherein the forward rotor is tilted downwardly at a negative tilt angle relative to the fuselage and the aft rotor is tilted upwardly at a positive tilt angle relative to the fuselage.

US-A-2011/049307, published on Mar. 3, 2011, describes a ducted airflow vehicle which includes a fuselage having a longitudinal axis, is forward supported and possesses aft airflow ducts having respective lift fans arranged to force the surrounding air into said ducts through inlets at the upper ends of said ducts and out of the ducts through outlets at lower ends of said ducts, creating thereby a lift force. A single engine is located on one side of said longitudinal axis, and is operatively configured to power the lift fans. A payload bay is located in a central area of the fuselage, between the forward and aft ducts, spanning the longitudinal axis.

ES-A-2 354 796, published on Mar. 18, 2011, describes a flying vehicle, comprising of a body (1) of discoid configuration, incorporating, at the bottom, a foot support (2), while also having arms in the upper part (3) which behave as radial blades (4) that may vary their position individually between a horizontal position and a vertical position.

CN 102 020 020, published on Mar. 20, 2011, describes an aerospace, flying, saucer aircraft, and belongs to the cutting-edge technology in the field of aerospace. The aerospace flying saucer aircraft is provided with a direct, dual-shaft, counter-rotating, turbo-shaft engine and a rocket engine; when the aerospace flying saucer aircraft flies in the atmosphere of the earth, the direct dual-shaft counter-rotating turbo-shaft engine is utilized to provide power; when the aerospace flying saucer aircraft flies in outer space, the rocket engine is utilized to provide power; also, when the aerospace flying saucer aircraft flies in the atmosphere of the earth, the two engines can be started simultaneously, and the aerospace flying saucer aircraft does not need a runway, capable of vertical takeoff and landing, and able to freely fly at a high speed or a low speed through control.

US-A-2011/168834, published on Jul. 14, 2011, describes a vehicle including a fuselage that has a longitudinal axis and a transversal axis; two ducted, fanned, lift-producing propellers carried by the fuselage on each side of the transversal axis; a pilot's compartment formed in the fuselage between the lift-producing propellers and, significantly, aligned with one side of the fuselage; a payload bay formed in the fuselage between the lift-producing propellers and opposite the pilot's compartment, as well as two pusher fans located at the rear of the vehicle. Many variations are described enabling the vehicle to be used not only as a VTOL vehicle, but also as a multi-function utility vehicle possessing numerous applications such as hovercraft and ATV functions. Also described is an Unmanned version of the vehicle, as well as unique features applicable in any single or multiple ducted fans and VTOL vehicles.

US 20120032032 A1 published on Feb. 9, 2012 relates to lift platform with a kinesthetic control system that is coupled to means for altering air flow through the first and second longitudinally-spaced ducts comprising the lift platform is provided. The control system includes a control handle bar with left and right hand grips, and first and second control roll bars located on either side of the lift platform's central cowling. Forward/rearward movement of the control handle bar from a neutral position generates nose-down/nose-up pitching moments, respectively; counterclockwise/clockwise movement of the control handle bar from the neutral position generates counterclockwise rotation/clockwise rotation of the lift platform about a lift platform vertical centerline; and left movement/right movement of the control roll bars generates left roll/right roll moments about the lift platform roll axis.

US-A-2012/080564, published on Apr. 5, 2012, describes a ducted fan for a VTOL vehicle including, notably, a cylindrical duct having an inlet at an upper end and an outlet at a lower end, as well as an air-mover unit located within the significantly cylindrical duct. The duct also includes inner and outer wall portions and a significantly annular upper lip connecting the inner and outer wall portions, thus defining the inlet. The significantly annular upper lip has opposed fore and aft portions, opposed side portions and is provided with at least first and second openings, respectively, at each of the opposed side portions. The first and second arrays of openings permit flow of air into at least the first and second respective chambers formed within the duct, the first and second chambers connected by at least one passageway to thereby enable substantial equalization of surface pressure at the opposed side portions of the essentially annular upper lip.

IL-A-175265, published on May 31, 2012, describes an object of the present invention providing a vehicle of relatively simple and inexpensive construction and yet capable of performing a multiplicity of functions. According to the present invention, the proposed vehicle comprises: a fuselage having a longitudinal and a transversal axes; at least one lift-producing propeller carried by the fuselage on each side of the transversal axis; a pilot's compartment formed in the fuselage between the lift-producing propellers and notably aligned with the longitudinal axis; as well as a pair of payload bays formed in the fuselage between the lift-producing propellers and on opposite sides of the pilot's compartment.

WO 2012/113158, published on Aug. 30, 2012, describes a helicopter including a fuselage (1) and propellers (3). The propellers (3) are provided under the fuselage (1). The helicopter solves the problem of prior art that the low carrier capacity is caused by the low, lifting capacity and improves the carrier capacity remarkably.

CN 202464125, published on Oct. 3, 2012, describes a vertical takeoff and landing (VTOL) aerobat with a twin-duct, composite tail rudder, comprising an airframe, load-bearing wings, two ducts, a composite tail rudder and alighting gears, where the two ducts are connected with the airframe through the load-bearing wings, and are symmetrically arranged, and where the load-bearing wings are wing units of a convex-type thin-walled structure. One end of the composite tail rudder is connected with the lower part of the airframe, while the other end of the composite tail rudder is of a planar fin-like structure, a shock absorption cushion being arranged in the middle part of the composite tail rudder, and the planar fin-like structure of the composite tail rudder making an appropriate angle with a transversal section of the airframe. Miniature ducts that configure propellers are arranged in the middle part of the composite tail rudder, and the alighting gears are symmetrically arranged on both sides of the airframe. By the adoption of the technical schemes, the aerobat can take off and land vertically, without a limitation of emplacement, and can hover and circle with convenience in operation, the aerobat having the advantages of low speed at low altitudes and high speed at high altitudes, high flying efficiency, low flight noise and good stealth; it can be used for executing tasks of carry, scout, surveillance, attack, amongst others, and has high value in its applications.

U.S. Pat. No. 8,608,104 B2 submitted on Oct. 10, 2012 relates to a propulsion device (10) comprising a body (1 1) arranged for receiving a passenger (1) and engaging with a thrust unit (12 a, 12 b, 13 a, 13b) supplied with a pressurized fluid from a compression station. The arrangement of such a device offers great freedom of movement through the air or under the surface of a fluid. The invention also relates to a propulsion system in which the compression station can be remote in the form of a motorized marine vehicle.

DE 020 1 10 82719, published on Mar. 14, 2013, describes a helicopter (100) having two coaxial (13) or transversal rotors, or a combination of coaxial and transversal rotors, and a control unit (14) for directing the position of the rotors and rotor blades and regulating engine power. A gearbox device (15) transfers the driving force of a motor on the rotors, where the rotors are arranged in an aerodynamic protection device (17). A drive unit (10), the control unit and the gearbox device are secured to a fastening device. The control unit is fastened at a control lever (18) that is flexibly connected with the fastening device over the joints. The helicopter is made of a material that has small dead weight and high strength, such as carbon fibers, lightweight construction steels, aluminum and/or magnesium metal sheets.

U.S. Pat. No. 8,651,432 discloses a lift platform base assembly with a kinesthetic control system that is coupled to means for altering air flow through the first and second longitudinally-spaced ducts comprising the lift platform base assembly. The control system includes a control handle bar. Forward/rearward movement of the control handle bar from a neutral position generates nose-down/nose-up pitching moments, respectively; counterclockwise/clockwise movement of the control handle bar from the neutral position generates counterclockwise rotation/clockwise rotation of the lift platform base assembly about a lift platform base assembly vertical centerline; and left movement/right movement of the control roll bars generates left roll/right roll moments about the lift platform base assembly roll axis.

U.S. Pat. No. 7,581,608 describes a levitating platform, which is capable of stable flight. The platform comprises a platform structure. An air movement device is mounted on the platform structure to flow air into a plenum between a support surface, a bottom extended surface and a lip. The flow of air in the plenum creates positive and negative pressures within the plenum. The positive and negative pressures generate attractive and repelling forces between the platform structure and the support surface causing the platform structure to levitate off the support surface in a stable, controllable manner.

U.S. Pat. No. 7,484,687 discloses a personal flight device including a housing securable to a pilot, at least one pair of fans, and at least one engine mounted on the housing for driving the fans; one fan of the pair is mounted to one side of the housing and the other fan of the pair is mounted to the other side of the housing; in use, both fans rotate in the same direction for producing thrust. This flight device is strapped on the back of the pilot and requires the addition of steering vanes in order to provide proper control of the device There is therefore a need for a new VTOL vehicle free of at least one of the drawbacks of the VTOL vehicles of the prior art.

There is also a need for a VTOL vehicle that offers the possibility for a pilot to control the spatial orientation of the platform base assembly by moving at least part of his or her body, without the use of additional steering mechanisms or handlebars.

There is, additionally, a need for a method of manufacturing VTOL vehicles that presents at least one of the following features:
reliability;
cost-effectiveness; and
efficiency.

There is also a need for an easy and intuitive method for both learning how to fly and flying a VTOL vehicle.

SUMMARY OF THE INVENTION

An object of the present invention is to provide a vehicle that addresses at least one of the above-mentioned needs.

According to the present invention, there is provided a personal flight vehicle that comprises:
a platform base assembly providing a surface upon which the feet of an otherwise free-standing person can be positioned; and
a plurality of axial flow propulsion systems positioned about a periphery of the platform base assembly, where said propulsion systems generate a thrust flow in a direction substantially perpendicular to the surface of the platform base assembly, and the thrust flow is unobstructed by the platform base assembly and has the intensity to provide a maneuverability of a vehicle, selected from the group comprising vertical takeoff and landing, flight, hovering and locomotion.

In some implementations, the vehicle further includes a foot locking mechanism for locking the feet of the otherwise free-standing person.

In some implementations, the vehicle is shaped such that a center of mass of a combination of the vehicle and an average-sized person is positioned outside of a bounding box encompassing an outer delimitation of the vehicle.

In some implementations, the platform base assembly is sufficiently flexible so as to allow a controlled torsion of the platform base assembly.

In some implementations, the plurality of axial flow propulsion systems comprises two longitudinally separated propulsion systems.

In some implementations, a length of the vehicle is sized between 0.25 times and 3 times the height of an average-sized person.

In some implementations, the length of the vehicle is sized between 0.5 times and 2 times the height of an average-sized person.

In some implementations, a height of the vehicle is sized between 0.05 and 0.75 times the height of an average-sized person.

In some implementations, the height of the vehicle is sized between 0.1 and 0.5 times the height of an average-sized person.

In some implementations, a ratio of the weight of the vehicle with respect to a weight of an average-sized person is less than 1.

In some implementations, the vehicle further includes a pair of spaced-apart foot attachment mechanisms for removable attachment of the feet of the otherwise free-standing person.

In some implementations, the foot attachment mechanisms are positioned on the platform base assembly and provide a controllable torsion of the platform base assembly along a longitudinal axis of the platform base assembly.

In some implementations, a torsional modulus of elasticity of the platform base assembly is between 100 Nm/rad and 1000 Nm/rad.

In some implementations, the vehicle further includes a handheld controller for controlling thrust generated by the propulsion systems.

In some implementations, the propulsion systems are in a substantially common plane with the platform base assembly.

In some implementations, the propulsion systems are arranged and operated to minimize the gyroscopic effects that affect the vehicle, and to minimize gyroscopic-induced stresses within the platform base assembly.

In some implementations, minimization of the gyroscopic effects is accomplished by at least one of:
 use of counter-rotating parts in a direction opposite to rotating components of the propulsion systems;
 grouping of multiple propulsion systems such that half of them rotate in a clockwise direction and another half rotate in a counterclockwise direction;
 use of co-axial counter-rotating components within the propulsion systems; and
 minimization of rotational momentum of the rotating components within the propulsion systems.

In some implementations, the propulsion systems are powered from a power source selected from the group comprising: electric motors, gas engines and turbines.

In some implementations, the plurality of propulsion systems comprises an even number of between 2 and 12 fans.

In some implementations, the vehicle further includes protective nets covering at least a portion of the inlets of the propulsion systems.

In some implementations, the propulsion systems each comprise a ducted fan, and each ducted fan comprises a pair of sets of counter-rotating propellers.

In some implementations, each ducted fan is powered by a pair of gas engines, with each set of counter-rotating propellers being connected to a corresponding gas engine from the pair of gas engines.

In some implementations, a central cross-section of the platform base assembly is substantially oval-shaped and comprises a plurality of fins extending towards a center-point of the cross-section.

In some implementations, the vehicle further includes a landing arm assembly attached to the platform base assembly, where the landing assembly provides stability for take-off and landing, and further provides shock absorption.

In some implementations, the handheld controller comprises first and second controller elements pivotably connected to each other, wherein a reduction in a spacing between the first and second controllers results in an increased thrust flow produced by the propulsion systems, and an increase in the spacing between the first and second controllers results in decreased thrust flow produced by the propulsion systems.

In some implementations, the handheld controller further comprises a strap that is removably attachable to a pilot of the vehicle.

In some implementations, at least one of the components of the vehicle is waterproof.

In some implementations, the propulsion systems are powered by gas engines, and each engine includes at least one valve positioned at an entrance of said engine and is configured so as to prevent water from entering an air intake duct in a water-landing scenario.

In some implementations, the propulsion systems are provided with an emergency shutdown capability, providing a rapid deceleration of the propeller elements of the propulsion systems upon impact of the propeller with water in a water-landing scenario.

According to the present invention, there is also provided a personal flight kit comprising:
 a personal flight vehicle as described above; and
 a wingsuit wearable by the otherwise free-standing person.

In some implementations, the vehicle is shaped to minimize drag in a direction parallel to the thrust flow from the axial propulsion systems and wherein the propulsion systems provide at least 50% of a static thrust upon displacement at a velocity of 100 km/h.

In some implementations, a rotational inertia of the thrust systems is minimized so as to provide rapid response in thrust intensity changes, allowing the pilot to accomplish aerobatic flight.

In some implementations, the propulsion systems have a power of at least 10 KW, and under 100 KW.

In some implementations, the vehicle further includes a flight control system, capable of flying the vehicle in an absence of a pilot, the flight control system including at least one of: autonomous flying capabilities, and remote-controlled flying capabilities.

In some implementations, the vehicle further includes a computer-assisted flight control system, capable of assisting the pilot during flight.

In some implementations, the vehicle further includes at least one of:
  a) a safety monitoring system comprising:
     a safety bracelet connected to the vehicle through a connector; and
     a monitoring system validating whether the bracelet is connected to the vehicle, wherein a disconnection of the connector prevents the propulsion systems from running, and prevents unintended acceleration of the vehicle;
  b) a height sensor, in combination with a height control system, acting as a height limitation device, and preventing the vehicle from exceeding a preset level above a ground level;
  c) a quick-detach system allowing the otherwise free-standing person to swiftly detach from the vehicle in case of an emergency;
  d) headlights and navigation lights; and
  e) a presence sensor incorporated within the bindings that attach the feet of the otherwise free-standing person to the vehicle, with the sensor being activated only when a foot is strapped in the bindings, thus preventing unintended use of the vehicle.

In some implementations, the vehicle further includes an automatic electronic distance-to-ground stabilization electronic mechanism that is used to make the vehicle hover at a fixed altitude above the ground.

In some implementations, the vehicle's automatic distance-to-ground electronic stabilization electronic mechanism is set to stabilize the height between 0.5 m and 2 m above the ground.

In some implementations, the automatic distance-to-ground electronic stabilization mechanism is capable of stabilizing the vehicle at a set distance without a pilot (hover-autonomous mode).

In some implementations, the electronic stabilization mechanism detects the presence/absence of the pilot, and is set to automatically reduce the vehicle's velocity to zero in case of the absence of a pilot.

In some implementations, the electronic stabilization mechanism has two different target altitudes, one in case the pilot is on the vehicle and another one where the vehicle hovers by itself.

In some implementations, the electronic stabilization mechanism uses a set of sonars to measure the distance of the aircraft to the ground.

In some implementations, the vehicle further includes at least one of the following characteristics:
  a) The vehicle's frame is rigid.
  b) The vehicle contains 2 main ducted fans powered by 2 gas engines.
  c) The vehicle contains 4 smaller electric ducted fans, powered by batteries.
  d) The vehicle contains a center area where a user can stand.
  e) At least some of the ducted fans are not entirely perpendicular to the vehicle, and direct a portion of the thrust towards a direction called "front", which is aligned with the longitudinal direction of the vehicle. The opposite direction will be called back.
  f) The vehicle has a fin (aileron) on the underside to minimize movement and increase drag along the non-longitudinal direction. Additionally, the fin is larger at the "back" of the vehicle.

In some implementations, a roll tilt is detected by the control system, and the control system in turn commands a torque around the z-axis, proportional to the detected tilt, thus allowing the pilot to control the vehicle's yaw angle by tilting the vehicle around its longitudinal axis.

Another object of the present invention is constituted by a family of platform shaped vehicles capable of carrying a pilot in the air, the pilot being preferably in standing position with respect to the platform based assembly of said vehicle, allowing the pilot to control the spatial orientation of the platform based assembly and the movement of the vehicle by the movement, preferably direct, of at least part of his or her body, including at least one of the following properties:
  a) the pilot's feet are secured to the platform based assembly;
  b) the center of mass of the platform based assembly-pilot system is outside of the platform based assembly's bounding box, which is defined as the smallest rectangular cuboid encompassing the entirety of the platform based assembly;
  c) the platform based assembly contains at least one flexible element allowing a controlled torsion of the platform based assembly; and
  d) the platform based assembly contains at least two separated propulsion systems.

These platform-shaped vehicles advantageously allow the pilot to control the platform-based assembly's spatial orientation by moving the lower part of his or her body, and particularly by the movement of his or her feet.

According to a preferred embodiment, the changes in the orientation of the platform-based assembly modify the thrust direction, allowing a control similar to thrust vectoring.

According to another preferred embodiment, these platform-shaped vehicles have Vertical Takeoff and Landing capabilities.

Preferably, these vehicles are approximately symmetrical with respect to the XY plane, where XYZ is a frame of reference attached to the vehicle, wherein the point of origin O is at the platform based assembly's center of mass; the X axis is defined in the direction going from the left foot attachment point to the right one, and inside of the platform based assembly's plane; the Y axis points forward and away from the pilot's body, is perpendicular to X and also exists within the plane of the platform based assembly; the Z axis points perpendicularly upwards from the platform based assembly's plane toward the head of the pilot.

Vehicles of the invention wherein the XY dimensions of the platform base assembly are ranging from 0.25 to 3 times, and preferably from 0.5 to 2 times the pilot's height are of particular interest.

The vehicles wherein the Z dimension is ranging from 0.05 to 0.75 times, and favorably from 0.1 to 0.5 times the pilot's height, are also of a particular interest.

The vehicles wherein the ratio of the platform base assembly's weight to the pilot's weight is lower than 1 are of particular interest as well.

The preferred family of vehicles of the invention is composed of the vehicles comprising a frame having an approximately planar form wherein the propulsion means are preferably constituted of at least 2 propulsion systems, configured to create a force having a direction approximately perpendicular to the platform base assembly in the positive direction of the Z axis.

Preferably, the vehicles of the invention comprise:
a) a frame on which the pilot stands with his or her feet secured to said frame at 2 separate attachment points, the 2 attachment areas being connected to the frame in a way as to allow a controlled torsion around the X axis; the connection between both attachments areas being beneficially flexible, allowing a torsion around X, and around the flexible element (A);
b) wherein the propulsion means are composed of two sets of propulsion systems, placed on both the right and left sides of the pilot, wherein the controlled torsion of the flexible element (A) generates a misalignment between the sets of propulsion systems, which in turn generates a torque that allows the pilot to turn in the right or left direction around the Z axis; and
c) optionally, a hand-held controller (C) allowing the pilot to control the thrust generated by the propulsion means.

In the vehicles, the propulsion means elements are beneficially placed approximately within a plane that is the plane of the platform base assembly.

The propulsion means are preferably designed to minimize or, ideally, cancel out the gyroscopic effects experienced by the whole vehicle.

Beneficially, these vehicles are conceived in a way that each right and left set of propulsion means are designed to minimize or, ideally, cancel out their gyroscopic effects, thus generating no gyroscopic stresses within the central part of the frame.

The minimization of the gyroscopic effects of each of the right and left set of propulsion systems is attained through at least one of the following means:
a) using counter-rotating parts such as high speed rotating flywheels turning in a direction opposite that of the propeller;
b) grouping multiple smaller propulsion means where half of them rotate clockwise (CW) and the other half rotate counterclockwise (CCW);
c) using co-axial counter rotating propellers; and
d) minimizing rotational momentum of rotating parts.

The propulsion means are advantageously propeller-based, wherein the propulsion means are advantageously powered by at least one of the following devices: an electric motor, a gas engine and/or a turbine.

According to another preferred family of the platform-shaped vehicles, the propulsion means are composed of n, preferably ducted, fans, where n is even, and ranges, preferably, from 2 to 12. Of a particular interest are those platform-shaped vehicles wherein the propulsion means are 2 ducted fans, those wherein the propulsion means are 4 ducted fans, those wherein the propulsion means are 6 ducted fans, those wherein the propulsion means are 8 ducted fans and those wherein the propulsion means are 10 ducted fans.

Optionally, a protective net covers at least part of the entrance to the duct.

Platform-shaped vehicles wherein each ducted fan contains 2 sets of counter-rotating propellers are of a particular interest.

Platform shaped vehicles wherein each ducted fan is powered by 2 gas engines, each set of propellers being connected to its dedicated engine, are of a particular interest.

The vehicles of the invention wherein a reduction mechanism is used for efficient coupling between the engine and the corresponding propeller are of a particular interest.

The platform-shaped vehicles, wherein the flexible element (A) has a cross-section (with respect to the Y-Z plane) that is approximately oval-shaped, preferably with fins protruding towards its center and, favorably, symmetrically positioned with respect to the center of the flexible element (A), are of a particular interest. Ideally, the cross section of the flexible element contains 4 fins.

A preferred family of platform-shaped vehicles of the invention is constituted by those vehicles wherein outward bent landing arms are attached or are part of the frame; these legs, named landing arms (B), provide stability for landing and takeoff as well as shock absorption. Favorably, an vehicle has 4 landing arms.

Another preferred family of the platform-shaped vehicles of the invention consists of those vehicles having a frame shaped as follows:
a) a central connection bar connecting the two feet attachment areas, where the distance between the attachment areas is ranging from 0.5 m to 0.8 m, and
b) 4 motor-attachment arms that are linked to each attachment area (for a total of 8 motor-arms), where a motor-propeller assembly is mounted on each arm, the propellers are located under the arms, and all the propellers are placed approximately within a plane.

The motor attachment arm's lengths are thus preferably minimized, the distance between the discs within which the propellers rotate and the neighbouring discs (corresponding to the neighbouring propellers) are within 1% to 20% of the disc's diameter.

The frame may thus also be advantageously equipped with at least 4 landing arms (B), (2 per attachment point), protruding downwards and bent outwards.

According to a preferred embodiment, the frame is composed of 2 parallel ducted fans attached by a central flexible bar (A); the frame and/or the central flexible bar (A) is/are at least partially made of a material of the carbon fiber type.

The intensity of the thrust is ideally controlled by the hand-held device (C) attached or held into the pilot's hand.

The hand-held device (C) is favorably configured in a way such that the pilot's movement to close his or her hand generates an increased amount of power. The hand-held device (C) is preferably formed of 2 plates of roughly rectangular shape that have one edge in common and that are capable of pivoting around that common edge, wherein the relative position between the 2 plates is determined using preferably a magnetic angular position sensor or a potentiometer.

The hand-held device (C) is favorably attached with a strap to the pilot's hand.

According to another preferred embodiment, the controller has a shape similar to pliers with a spring that allows the pliers to be automatically released in an open position in the absence of pressure from the pilot's hand. The relative position between the 2 plates is determined using preferably a magnetic angular position sensor or a potentiometer.

Another preferred family of the platform-shaped vehicles of the invention is constituted by those vehicles wherein at least one, and preferably all, component(s) of the vehicle is/are water proof.

Another preferred family of the platform-shaped vehicles of the invention is constituted by those vehicles wherein at least one propulsion means is of the gas engine type, and thus, at least one valve, positioned at the entrance of the engine's air intake, is present and prevents water from entering the air intake in case of a water landing.

The propulsion means are favorably designed in a way as to allow emergency shutdown and rapid deceleration of the propellers, allowing, for example in case of a water landing, minimal impact between propellers and water.

The pilot is beneficially wearing equipment designed for improving his or her aerodynamic and/or to improve his or her lift.

According to yet another embodiment of particular interest, a platform-shaped vehicle wherein its shape is designed to have minimal drag when moving at high velocity in the positive Z direction, and where the propulsion systems are built in such a way as to provide at least 50% of their static thrust at a displacement velocity of 100 km/h in the positive Z direction. In that case, the pilot can lean forward until his body becomes approximately horizontal to the ground and achieve high-speed forward flight, where the vehicle-pilot system relies on lift to maintain flight.

Another preferred family of the platform shaped vehicles of the invention is constituted by those vehicles comprising:
   a) a rigid frame on which the pilot stands with his or her feet fastened to it at 2 separate attachment points, the binding mechanism comprising torque sensors around the X axis, which are capable of sensing the twisting movement of the feet around the X axis;
   b) propulsion means composed of at least one propulsion system, where the torque around the propulsion axis can be controlled (using, for example, counter-rotating propellers driven by independent engines), and where the twisting movement of the feet controls the total torque of the thrust system around the Z axis, and
   c) optionally, a hand-held controller allowing the pilot to control the thrust generated by the propulsion means.

Those vehicles comprising 2 ducted fans of a diameter ranging from 0.6 m to 1.2 meters, a connecting arm ranging from 0.4 m to 0.8 meters, the height of the vehicle ranging between 0.4 m and 0.8 meters and propulsion means having a power of at least 10 KW and preferably of less than 100 KW, are of particular interest.

According to an alternative embodiment, the vehicle is equipped with automated ability to fly in the absence of a pilot, having, preferably, autonomous flying abilities and remote controlled flying capacity. The vehicles may also be favorably equipped with a flight-control system capable of assisting the pilot during flight.

The vehicles are optionally designed in a way as to allow at least one passenger to place himself on the platform base assembly.

Additionally, the vehicles where one or more system(s) from the following list is/are implemented, are of particular interest:
   a) safety bracelet composed of a flexible part connected to the vehicle through an electrical connector and a corresponding connector, a monitoring system validating that the bracelet is connected to the vehicle; a failure in this validation prevents the engines from running, therefore preventing unintended acceleration when the pilot does not hold the controller in his or her hand;
   b) a height sensor which, in combination with software and a computerized system, acts as a height limitation device, preventing the machine from exceeding a certain height above the ground;
   c) a quick-detach system allowing the pilot to quickly detach from the platform base assembly in case of an emergency;
   d) a parachute or a ballistic parachute that the pilot can carry on the platform base assembly in order to provide aid in case of any unrecoverable failure of the vehicle;
   e) headlights and navigation lights that may or may not be of LED type and that may or may not be of the strobe light type;
   f) a presence sensor incorporated within the bindings that secure the pilot's boots to the frame which is only activated when a boot is strapped in, therefore preventing the unintended use of the vehicle;
   g) a display indicating the vehicle's status, which may or may not be part of the hand-held controller;
   e) audible alarms;
   f) a collision detection device capable of predicting collisions with static solids or moving objects;
   g) fuel level sensors, low fuel sensors and fuel related alarms; and h) an electric starter in case of gas engines.

Moreover, these vehicles may comprise a display as well as a computerized system indicating valuable information to the pilot, including but not limited to the vehicle's status, position and possibly topological information about the environment surrounding the vehicle, information about positioning and risks associated with nearby vehicles, alarms, as well as readings of various sensors; it may be part of the controller, may be attached to the user's forearm or may be integrated within the pilot's glasses or helmet.

Vehicles where an electric starter is used to start the engines are of particular interest. Also, a single electric starter may successively starts 2 or more engines.

Another object of the present invention is constituted by the manufacturing processes, for manufacturing a platform shaped vehicle, as defined in the first object of the present invention, by assembling the constituting parts of said vehicle.

The assembly of the constituting parts is favorably performed employing industry standard procedures.

The building parts of the vehicle that are favorably made of carbon fiber are built using industry standard methods for carbon fiber molding and vacuum bagging.

The bonding of carbon fiber elements is made, thus, favorably using industry standard bonding agents.

The metal building parts of the vehicle may also be built advantageously using CNC machining and industry standard methods.

The manufacturing processes of assembling vehicle component parts comprising the use of screws, rivets, bolts and bonding agents, are of a particular interest.

Another object of the present invention consists of the methods for flying a platform-shaped vehicle, as defined in the first object of the invention, or as manufactured by a process as described in the second object of the invention, comprising at least one of the following steps:
   a) balancing the vehicle using the pilot's own reflexes, lower part of the body, and feet; and
   b) regulating the propulsion intensity by a regulating mean such as a hand-controller.

Another method for using the vehicle is one wherein the pilot fastens his or her feet to the attachments areas, starts at least parts of the propulsion means, takes off by increasing the propulsion intensity and flies the vehicle controlling the spatial movement by the power of the propulsion means and by the displacement of the body respective to the vehicle.

Of particular interest are those methods for using a platform-shaped vehicle as defined in the first object, or as manufactured through the process described in the second object, wherein, in the absence or in the presence of a pilot, an automat flies the vehicle allowing the displacement of the vehicle from point A to point B; the displacement also optionally includes take-off and landing of the vehicle.

The displacement of the vehicle may also be remotely controlled.

Also of particular interest are those methods for using a platform-shaped vehicle as defined in the first object of the invention, wherein at least one passenger is taking part in the flight, preferably standing on the platform base assembly of the vehicle, and preferably positioned in a very closely to the pilot's body.

Favorably, these methods comprise the steps of:
a) Pre-flight checklist related to the vehicle: controller check (full travel), controller check (friction on), energy source check, motor check, batteries check, generator check, electronics check, ignition switch check;
b) Pre-flight procedures related to the vehicle: strap-in, engine startup; and
c) Takeoff procedure related to the vehicle: Clearance check.

A method for flying the platform-shaped vehicle wherein the pilot can lean forward and go from his or her standing (vertical) position to an approximately horizontal position, in which case the aerodynamic forces on the pilot provide lift and the propulsion means are used mostly for lateral displacement, and, in which case, the preparation for landing involves the pilot leaning back to his of her vertical position, is of particular interest.

The landing procedure related to the vehicle is thus favorably determined after a clearance check and inspection of the configuration and nature of the landing surface.

In the case of a solid landing surface, the landing procedure thus favorably comprises a progressive reduction of the thrust intensity.

In the case of a liquid landing surface, the landing procedure thus favorably comprises an emergency shutdown and rapid deceleration of the propulsion means.

In the case of a solid and non-horizontal landing surface, the landing procedure advantageously comprises an evaluation of the friction factor of the landing surface.

In the case of a recoverable power failure, for example if a propulsion system is partially failing, the center of mass of the vehicle and of the pilot have to be moved, preferably by an appropriate displacement of the pilot's body, further away from the faulty propulsion mean.

In the case of an unrecoverable power failure, the pilot makes use of the emergency shutdown procedure via the shutdown button and deployment of the parachute.

Another object of the present invention comprises the methods of learning how to fly the platform-shaped vehicle as defined in the first object or as manufactured in the second object, according to the following procedure: suspending the pilot using a rope. Usage of a rope tensioning mechanism that prevents the rope from becoming loose, risking to be aspirated by the thrusters.

These learning methods beneficially include training in emergency situations.

Another object of the invention is constituted by the uses of a platform-shaped vehicle, as defined in the first object of the invention or as manufactured in the second object of the invention, as vehicle for flying from a point A to a point B.

The uses may be of a recreational type, for example as a recreational vehicle, or of a non-recreational type, for example as an emergency vehicle for remote access to inaccessible areas.

The non-recreational types of uses may, for example, have the scope of surveillance and/or provide other military applications.

Vehicle and Control Modeling

The Applicant presents this explanation as a modeling example and it is not intended to be limitative in any way.

In its general form, the invention can be described as a platform base assembly (10) onto which the pilot (17) stands as portrayed in FIG. 1. The platform base assembly-pilot system is capable of flight given that its propulsion means are embedded in the platform base assembly, and provide a force in the Z direction. (XYZ, 0 being a frame of reference attached to the platform base assembly).

The pilot has contact with the platform base assembly preferably with his or her feet in areas 15 and 16. Each foot is either fastened to the platform base assembly or has a non-zero surface contact area, allowing the pilot to alter the platform base assembly's orientation using movements of the lower part of his or her body.

FIG. 2 illustrates a 2D simplified version of the pilot (17) in flight on the vehicle (10). For simplification purposes, one can consider that the vehicle has an insignificant inertia momentum around k, that the pilot has a rigid body that is kept in a straight position, that the pilot measures 2 m and weighs 100 kg, and that he can only control angle a and thrust vector norm |T|. Moreover, the impact of aerodynamic forces on the pilot are ignored, since they are minimal for low velocity displacements. Finally, g=10 is used for gravitational acceleration.

In this simplified 2D model of the flight, one can use angles to represent the orientation of the solids; 2 angles will be used to represent the angular position of the pilot and the vehicle:

θ, the angle representing the orientation of the pilot; that is, the rotation angle between the world frame of reference W, i, j and the human frame of reference H,i', j'. A positive θ angle indicates that the pilot is leaning back; a negative θ angle indicates that the pilot is leaning forward;

α, the angle representing the orientation of the vehicle with respect to the pilot's frame of reference. When α=0, the platform base assembly is aligned with the pilot, the thrust generated by the vehicle passes through the pilot's center of mass H, and generates no torque. When a is positive, the platform base assembly is rotated counterclockwise with respect to that position; when negative, the platform base assembly is rotated clockwise with respect to the zero-α position. The pilot is able to set the value of the angle a through movements of his or her lower body or feet. (The direction of T is j' rotated a radians around k); and ω will refer to the angular velocity of the pilot in rad/s.

In FIG. 2, the angle a is negative, and θ is negative as well.

Thrust vector T represents the total thrust force vector applied on the vehicle thanks to the propulsion means. Also, T is defined as the scalar norm of T. (T=|T|);

The momentum of inertia of the pilot around k is given by:

$$I = \frac{1}{12}mL^2 \qquad (1)$$

Which means I=100/3 in this case. Also, the torque applied on the pilot is calculated using a vector cross-product operation. Working in 2D, the torque vector has zero-components in the working plane, and can be defined as a scalar, using only the component in the direction k.

$$\tau = T \times HO \qquad (2)$$

Vector T can be represented according to reference frame H,i',j' as $$T_{hij} \begin{vmatrix} -T\sin(\alpha) \\ T\cos(\alpha) \\ 0 \end{vmatrix} \quad (3)$$

The vector HO in reference frame H,i',j',k is in fact the vector (0,−1,0). In that case $$\tau = T \cdot \sin(\alpha) \quad (4)$$

and, according to Newton's Second Law of Motion applied to rotating solids $$\frac{d\omega}{dt} = \frac{\tau}{I} \quad (5)$$

Using (4) and (5)

$$\frac{d\omega}{dt} = \frac{\tau \cdot \sin(\alpha)}{I} \quad (6)$$

However, since the sine function ranges from −1 to 1, ω' ranges from [−0,5*I*T, 0,5*I*T]; in this particular example, the thrust T is set such that its component in the j direction cancels out gravity, generating a constant-height trajectory. This means thrust has to be increased when vehicle is not vertical.

$$T_j = m \cdot g \quad (7)$$

Since T's direction is determined by α and θ, and its component in the j direction is defined by (7); T is completely defined.

This indicates that, modifying only the angle α, the pilot can increase or decrease ω; Using α, the pilot is able to control ω and make it go towards a target value, as long as $$\frac{d\omega}{dt}$$

is in a specific range.

Also, θ being the angle representing orientation of the pilot, by definition:

$$\frac{d\theta}{dt} = \omega \quad (8)$$

Moreover, $$\frac{d^2\theta}{dt^2} = \frac{T \cdot \sin(\alpha)}{I} \quad (9)$$

This indicates that θ, the angular position of the pilot's body and ω, the angular velocity of the pilot's body, can be controlled by carefully choosing α.

Acceleration of the pilot/vehicle system towards direction i can be calculated using the following formula, derived from Newton's second law of motion:

$$a_i = \frac{T_i}{m} \quad (10)$$

It is important to note that non-zero values for alpha are used only when a change in orientation is necessary. Once the pilot has reached a desired θ angle, setting alpha to 0 will generate no torque and the thrust vector will be aligned with the pilot's body. In the present case, this means that laying forward with a constant angle θ generates an acceleration towards the i direction.

One simple implementation of a system capable of flying this theoretical 2D vehicle would be the usage of the following formula in order to compute a, which is implemented as a PD control system:

$$\alpha = k_0 \cdot (\theta_{dest} - \theta) + k_1 \omega \quad (11)$$

Using values of k0=−5 and k1=0.5, a simulation of the pilot/vehicle system has been achieved and the results are presented in FIG. 18 (A differential equation is obtained by combining (7), (8), (9), (10) and (11) and is solved iteratively). The simulation achieved is a constant-height movement that starts with zero-velocity hovering, followed by an acceleration step towards the i direction, followed by a constant velocity and height flight in the i direction, followed by a deceleration towards zero-velocity hovering mode. FIG. 18 presents the variation of angles a and θ, normalized thrust intensity T, velocity v towards the direction i and the position with respect to the direction defined by i, as a function of time.

It is interesting to note that in order to achieve movement toward the i vector, the first step is to apply a negative angle θ, thus pushing the whole system in the opposite direction for a certain amount of time; this particular effect can be noticed when balancing a bicycle as well.

This exercise shows that it is possible to control the vehicle-pilot position using only the angle α and T, the thrust intensity. In practice, these calculations are achieved intuitively by the pilot and become reflexes during training, in a way similar to learning how to use a bicycle.

Another note is that, in the simplified form portrayed in FIG. 2, the pilot has no way of turning around the Z axis, as in the zero-velocity hovering mode for example. In order to allow that, two options are possible:
  a) Allow the pilot to bend the vehicle using a twisting movement of his or her feet, or
  b) Use propulsion systems that can control the residual torque around the thrust axis, as with using, for example, counter-rotating blades powered by independent power systems.

Implementations and considerations related to the vehicle
In most cases and preferably, the vehicle includes the following elements.
  a. A frame on which the pilot stands, provided:
    a.1 the frame has a low weight compared to the weight of the pilot, allowing the pilot to control the frame's orientation through the movement of his or her lower body and his or her feet;
    a.2 the frame provides 2 attachment points where the pilot must secure his or her feet in order to control it;
    a.3 the frame provides 2 or more attachment areas for propulsion means. If the frame provides more than 2, they are arranged in a way such that the propulsion means can be divided into 2 groups; and a.4 the frame is approximately symmetrical about the YZ plane. The frame may also be approximately symmetrical about the XZ plane.

b. Propulsion means providing thrust in mid-air. The propulsion means can be divided in two sets of propulsion systems that are approximately symmetrical about the YZ axis. High-speed rotating parts create a gyroscopic effect, and, if not minimized, can make the vehicle difficult to control. In order to minimize global gyroscopic effects (the gyroscopic effect generated by the machine as a whole), the high inertial momentum and high-speed rotating parts of the first set rotate in the opposite direction from their corresponding symmetrical part in the second set. However, the gyroscopic effect of each propulsion system can also be minimized, or, if possible, cancelled, as it generates stress inside the vehicle's body during quick changes in direction, and may also generate a twisting movement in some situations. Minimization of the gyroscopic effects of the propulsion system can be achieved through an optimal usage of materials and mass distribution, but can also be achieved with high-speed counter-rotating flywheel(s), or counter-rotating propellers or fans.

The frame and the propulsion means may be designed for high speed flight, by using a shape that minimizes drag in the Z direction, and by using propulsion means that can provide thrust even at substantial (more than 100 km/h) velocities in the positive Z direction.

c. A thrust controller (accelerator) that allows the pilots to control power delivery to the thrust systems.

d. Safety devices, preventing unintended activation of the thrust systems or/and limiting maximum power on thrust systems, keeping the pilot at a safe altitude range. Safety devices include but do not limit themselves to visual and audible alarms.

e. A central computer system carrying at least the following tasks:
  e.1 Reading the controller acceleration command and forwarding that command to the thrust system;
  e.2 If the thrust system uses variable pitch propellers, and the computer controls propellers' pitch, propeller pitch is selected in order to maximize thrust (if maximum thrust is requested), or to maximize overall thrust system efficiency (when a fraction of the maximum thrust is requested);
  e.3 Monitoring sensors including Thrust System Malfunction sensors, Low Fuel/Energy sensors, and Safety Device sensors; and
  e.4 Sending alarm signals when necessary.

An implementation of such a control system is presented in FIG. 17.

It is obvious that such a device can be implemented in a multitude of forms, using different technologies to accomplish functional subsystems.

The components, advantages and other features of the invention will become more apparent upon reading of the following non-restrictive description of some optional configurations, given for the purpose of exemplification only, with reference to the accompanying drawings.

DETAILED DESCRIPTION OF PREFERRED EMBODIMENTS OF THE INVENTION

Preliminary Definitions

Average sized person: A person having features or body parameters included between the $5^{th}$ percentile and $95^{th}$ percentile male or female in a male or female population in accordance, for example, with the anthropomorphic values provided in Appendix B of MIL-STD-1472 Rev. G Control similar to thrust vectoring: The vehicle being relatively low-weight (and with low inertial momentum) compared to the pilot, the pilot has the ability to control the vehicle's orientation and thus, its thrust direction.

Control through direct movement of body parts: Refers to using the pilot's unassisted body movements to control the vehicle directly. More specifically, the pilot's movement can change the orientation of the propulsion means which are in direct contact, or attached, to parts of his or her body.

Controlled torsion: The pilot being in contact with or attached to the vehicle at 2 distinct points on the right and left side, applying a torque on the vehicle around the X axis; the vehicle can be designed to allow this torque to induce a torsion around the X axis, in turn altering the alignment between the propulsion systems.

This controlled alteration can be used advantageously to provide additional control to the pilot.

Dimensions with respect to X, Y and Z axes: Vehicle's dimension with respect to each axis is defined by taking the dimensions of the smallest box aligned with XYZ that includes the vehicle.

Figure 1:
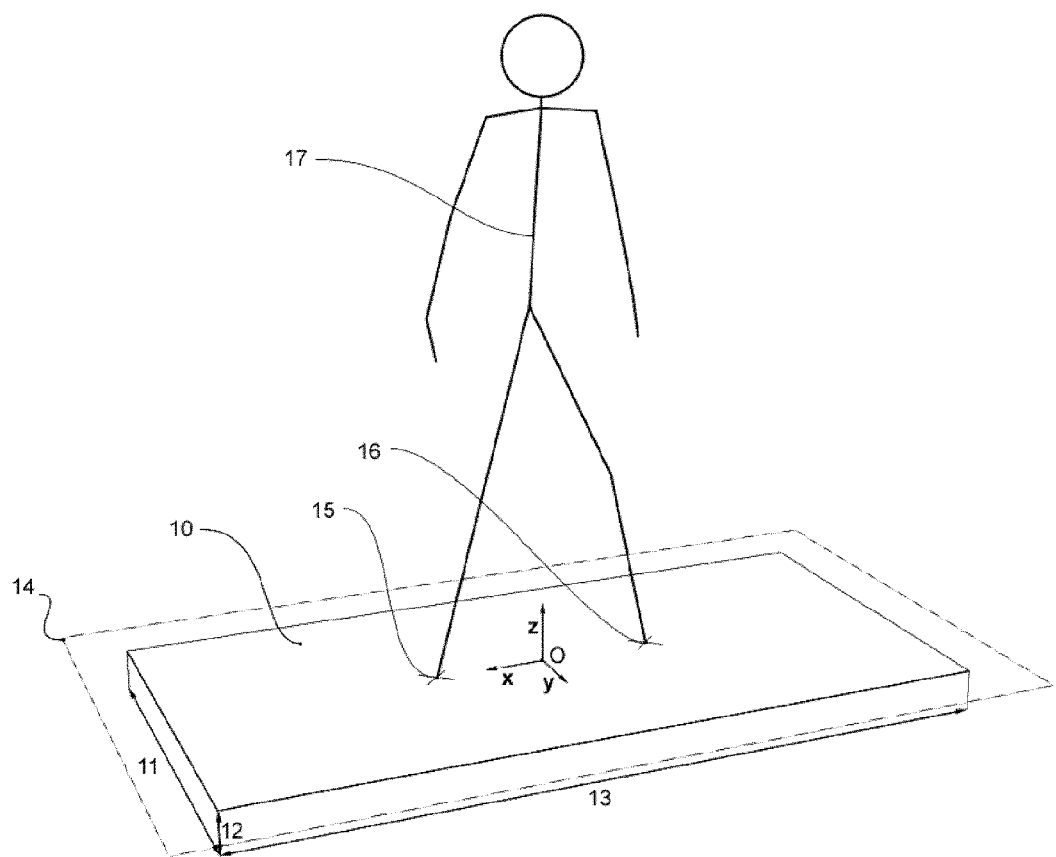
FIG. 1 represents a simplified description of the vehicle.

FIG. 1 illustrates the platform base assembly's dimensions:
 a) 13 is the dimension in the X direction;
 b) 11 is the dimension in the Y direction; and
 c) 12 is the dimension in the Z direction.

Passenger: A person standing on or being attached to the vehicle or to the pilot, that has no or relatively small control on the vehicle and who is being transported through the air along with the pilot and the vehicle.

Pilot: The person controlling the vehicle in terms of orientation, displacement, and thrust intensity. Additional loads may be attached to the pilot. Of course, the vehicle may be used without pilot when employing an automatic control system and/or remote control, for example in the case wherein the vehicle has to be moved from a place A to a place B in order to pick up the pilot.

Platform's vehicle plane: Plane (14) going through the center of mass of the vehicle and perpendicular to the propulsion direction, as depicted in FIG. 1.

Platform-shaped vehicle: Vehicle whose dimension in the Z direction is smaller than the one in the X-Y direction, excluding the pilot, and whose direction of propulsion is oriented in the positive Z direction.

Propulsion system: Unit assembly providing thrust in the air.

Propulsion means: The set comprising all thrust elements of the vehicle, constituted of a multitude of propulsion systems.

Propulsion systems on one side of the vehicle: The set comprising all thrust elements on one side of the vehicle, the vehicle being generally symmetric, this expression refers to half of the propulsion elements.

Recoverable failure: Failure that may affect the vehicle's maneuverability and control but where controlled flight and landing remain possible, and where the pilot has been trained for the said failure.

Static thrust: maximum thrust in N achieved by the propulsion means when the vehicle has a zero-displacement velocity, when surrounded by a volume of air of large dimensions compared to the vehicle, at sea-level pressures and ambient temperatures of 25 degrees.

Unrecoverable failure: Failure of at least one part which prevents safe flight and controlled landing.

XYZ Axes and Origin: X direction is defined as the direction from the left foot contact point with the vehicle towards the right foot contact point with the vehicle. Y direction is defined as perpendicular to X and within the platform base assembly's plane, pointing in front of the pilot. The Z direction is defined as the total propulsion direction. In this case, X, Y and Z form a direct orthogonal base. The origin O is defined as the center of mass of the vehicle.

The following detailed description is illustrative of preferred embodiments of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

Detailed Description of the Frame Embodiment

A novelty factor among others presented within this invention is related to a platform-shaped vehicle onto which the pilot stands and controls the flight using movements of his body, preferably the lower part of his or her body, wherein the platform based assembly's dimensions in XY plane is comparable to the pilot's height (within 0.25 and 3 times his or her height) and is less than 0.75 times the pilot's height on the Z axis.

Figure 2:
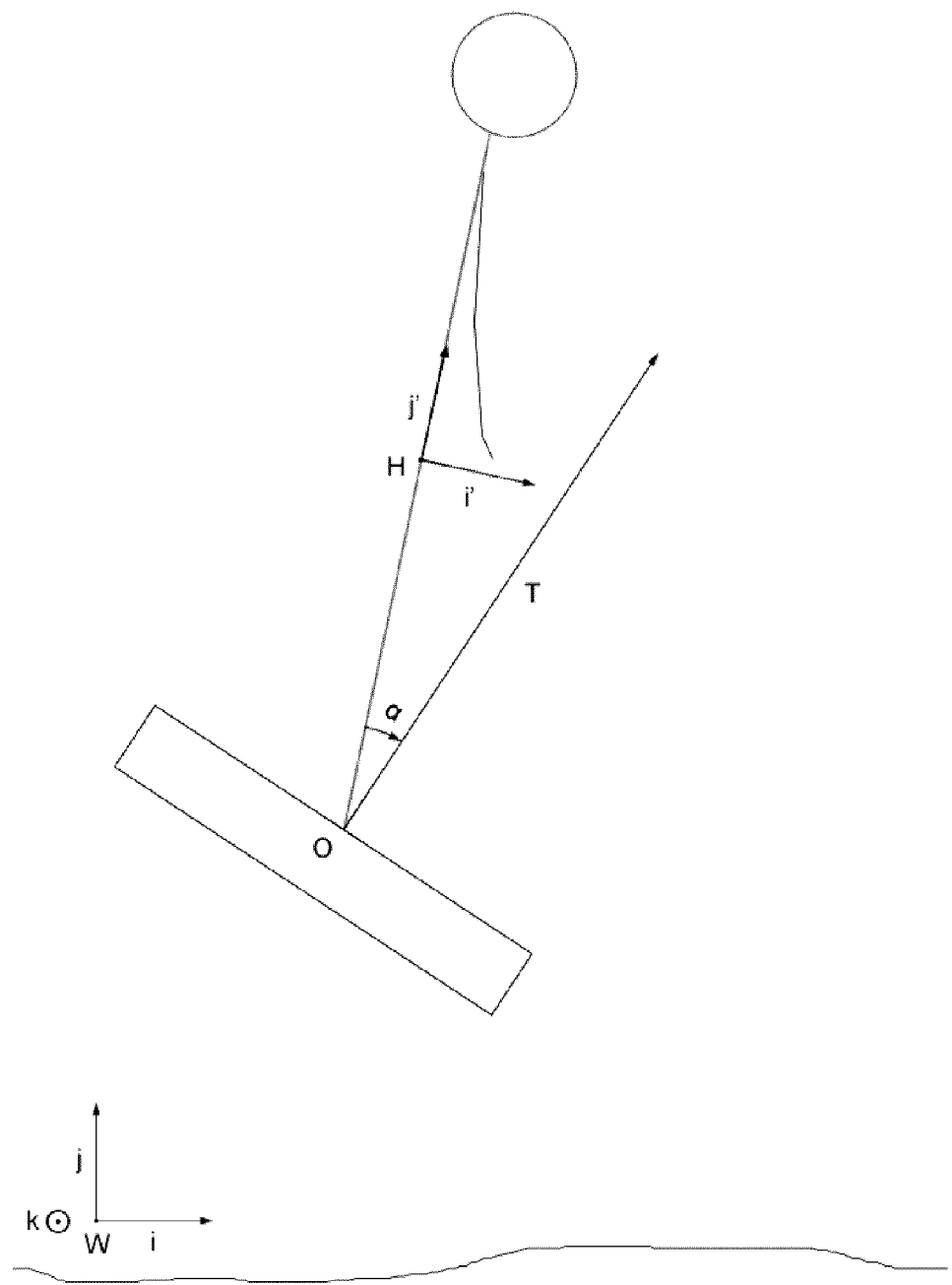
FIG. 2 describes the forces applied on the pilot when using the vehicle, where the symbol O denotes a vector perpendicular to the screen, pointing towards the reader.
Figure 3:
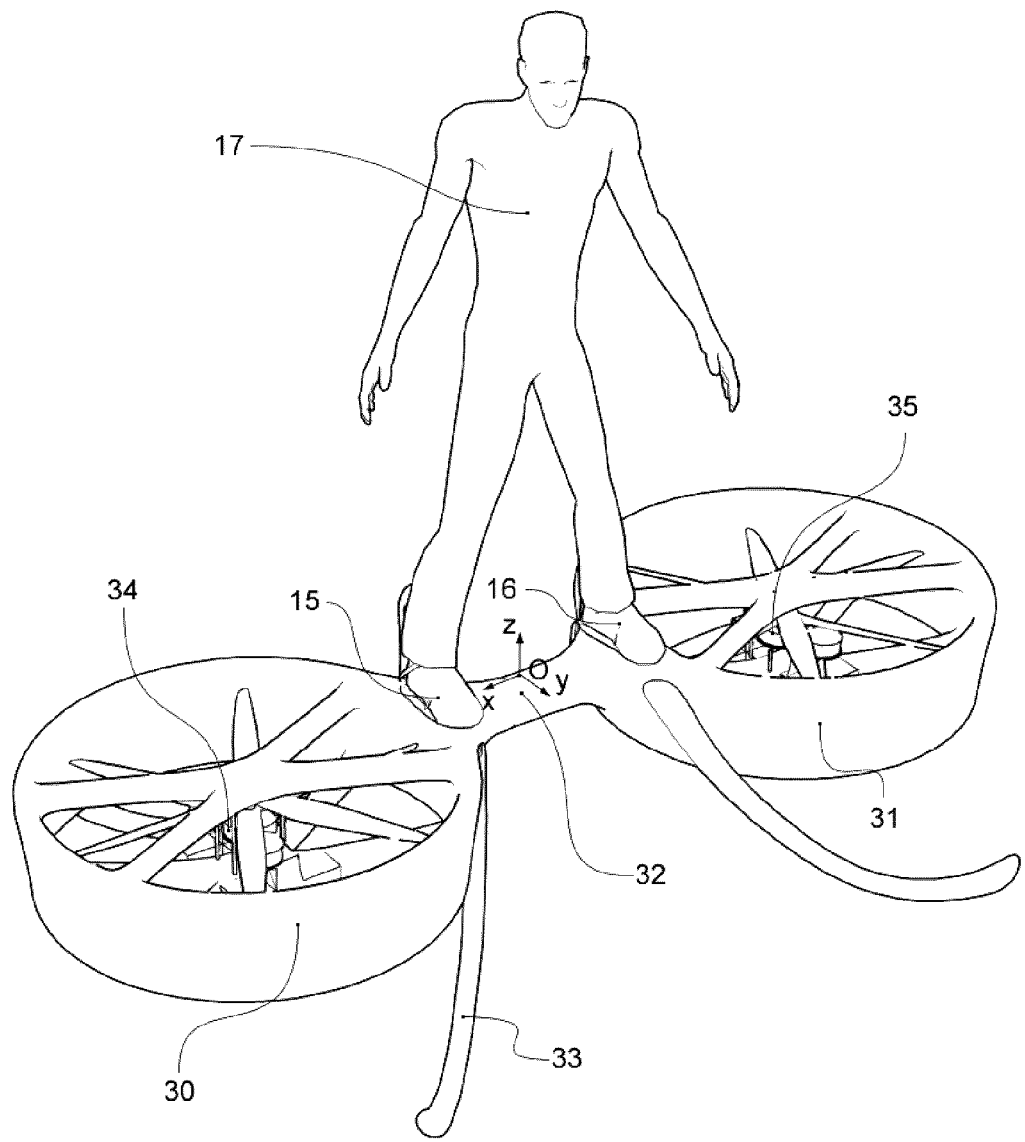
FIG. 3 portrays a dual ducted fan embodiment.
Figure 4:
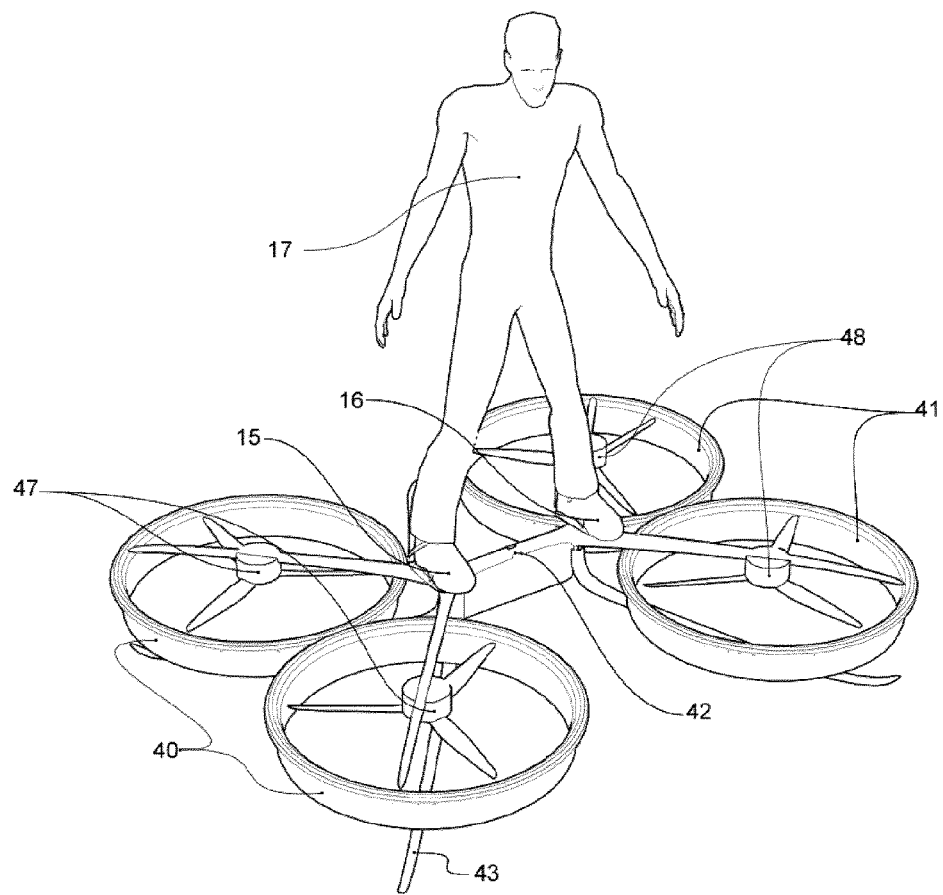
FIG. 4 presents a quad ducted fan embodiment.
Figure 5:
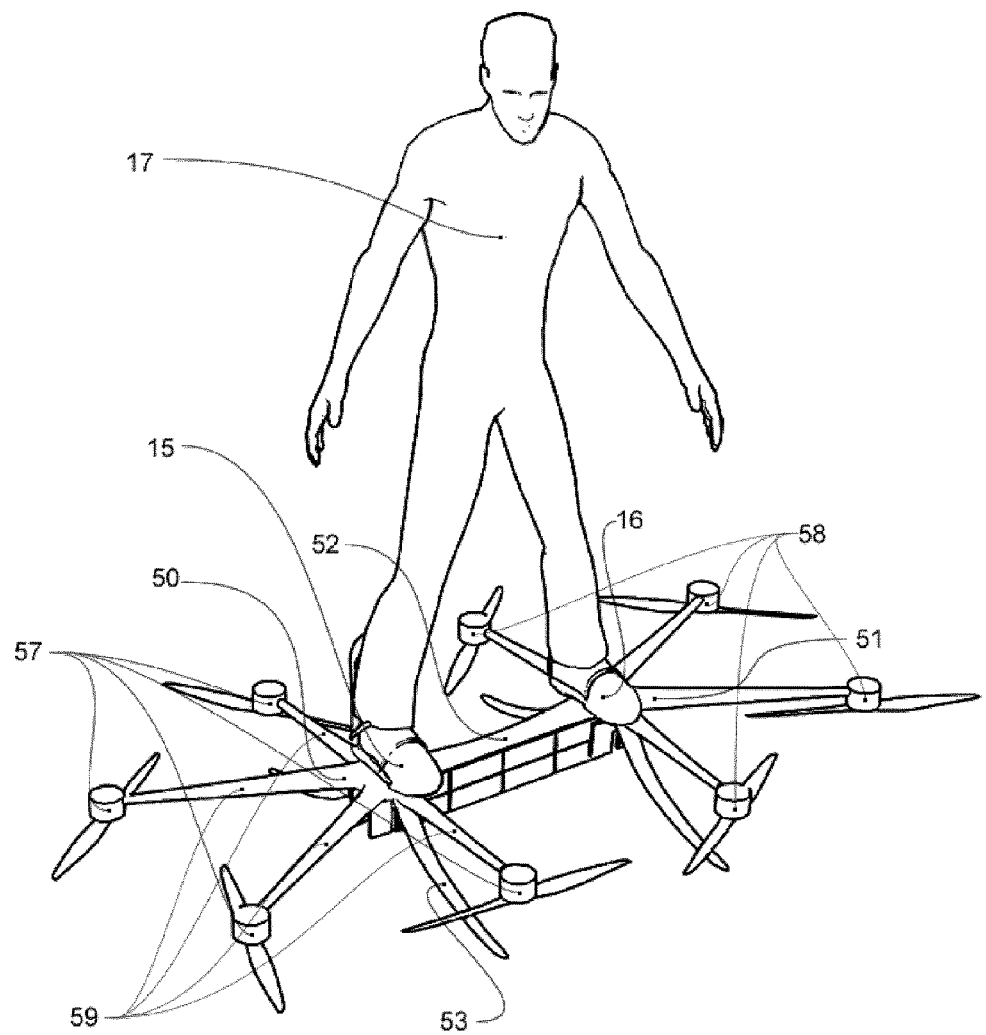
FIG. 5 presents an octo-copter embodiment.

In this specified case, the frame's shape can vary within different embodiments, while staying within the scope of the invention. Its function is to hold the components of the vehicle together, and is therefore dependent on the choice of propulsion means and their shape. 3 different shapes are illustrated in FIG. 3, FIG. 4 and FIG. 5; FIG. 1 represents a dual-ducted fan implementation. FIG. 2 represents a quad-ducted fan implementation. FIG. 3 represents an octo-copter implementation, with non-ducted propellers. These implementations are presented for illustrative purposes only and it is obvious that a person skilled in the art can design a frame that is of a different shape, with different number of attachment arms or with a different number of ducted fans, all the meanwhile remaining within the scope of this invention.

However, within the 3 frame implementations presented, the frame is approximately symmetrical about the YZ plane and composed of 3 sections: the central section of the body is either 32, 42, or 52; the right section of the body is either 30, 40, or 50; finally, the left section of the body is either 31, 41 or 51. Within all presented embodiments, the pilot is secured to the frame at attachment areas 15 and 16. They represent the only regions of contact between the pilot and the vehicle in normal flight.

Figure 6:
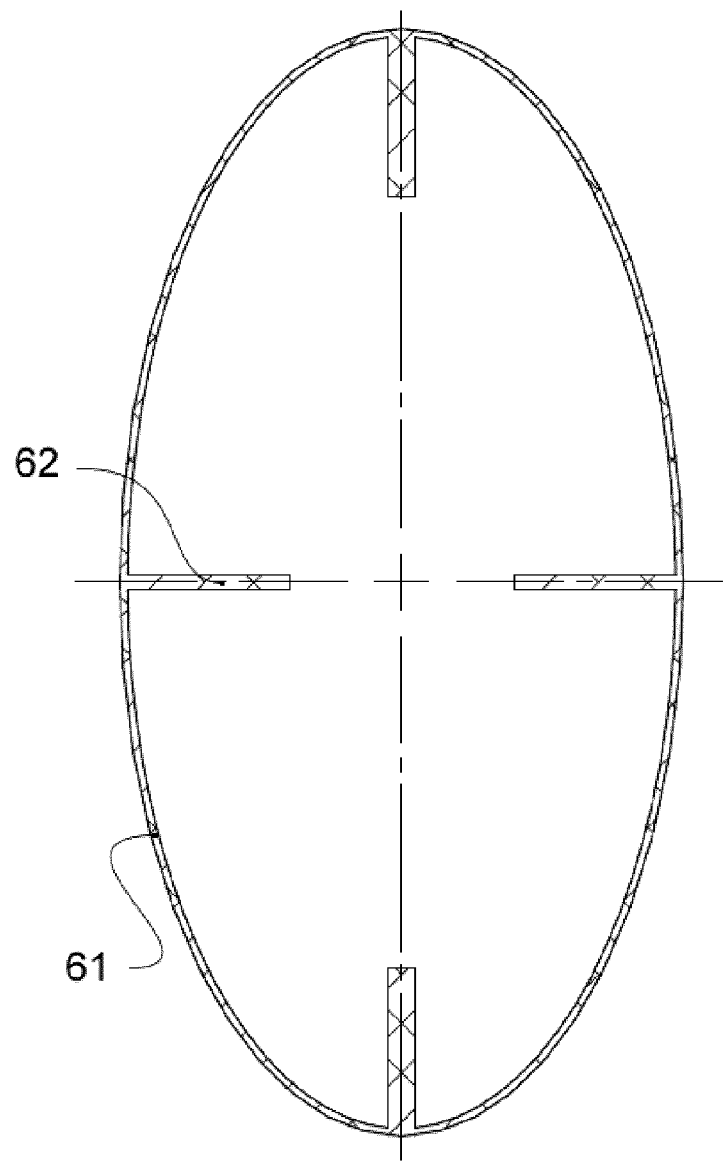
FIG. 6 presents a central rod section view of the frame.

As a general construction guideline, within the presented implementations, the frame is composed of a composite outer shell (FIG. 6), and the interior is built using a low-density foam-type material. Whereas the stress is supported by the exterior composite, the low-density interior lowers the overall density of the machine. The target overall density for the whole vehicle is the density of water, preventing the pilot and the machine from sinking in case of a water landing.

Figure 7:
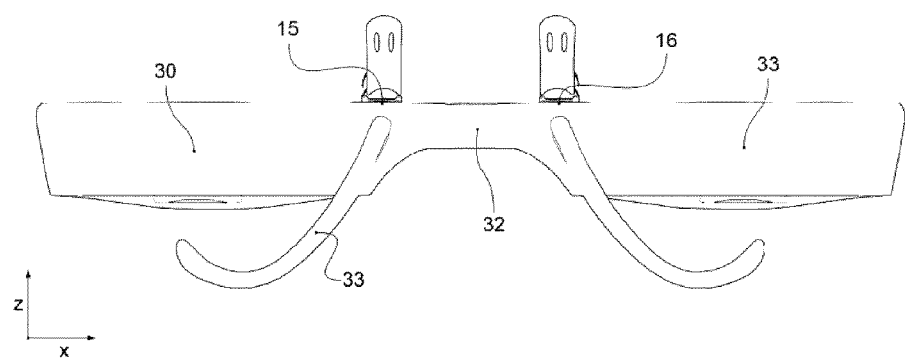
FIG. 7 presents a side-view of a dual, ducted, fan embodiment.

FIG. 4 represents a sectional view of the central section, through the frame's symmetry plane. It is designed to allow a controlled twisting movement in normal operation, which in turn generates a misalignment between the propulsion systems on one side of the vehicle and the propulsion systems on the other side, and therefore generates a torque around the Z-axis. For this purpose, a custom cross-section has been used, described in FIG. 7. Fins (62) have been integrated into the standard shell design; they support bending stress, but also have a low torsion constant. These fins may be extended all the way to the center of the oval. This allows the shell thickness to be varied in order to obtain diverse torsion constants, all the while maintaining maximum bending moment high. The torsion elastic modulus of the central bar has been selected to allow the pilot to twist the vehicle with the unassisted force of his feet, and can be preferably in the range 100 Nm/rad to 1000 Nm/rad.

Moreover, certain redundant propulsion systems on one side of the vehicle generate a torque in case of partial failure. The torque generated by twisting the vehicle's frame at the maximum can at least match this residual torque, in order to allow controlled landing even in case of partial failure.

Within all presented embodiments, the vehicle is equipped with 4 legs (One leg is identified in each implementation as 33,43,53); within normal operation, they are the only parts of the vehicle touching the ground during takeoff and landing. These legs can be part of the frame or can be attached to the frame. In all cases, their base is close to fastening areas 15 and 16, and their extremities form a rectangle large enough to ensure stable landing. Minimum landing-rectangle sizes are 0.6 m in each direction. The legs are bent upwards and touch the ground at a tangency point close to the extremity of the leg; this shape is very convenient for this particular application as impact energy is in part transformed into heat due to the leg's friction on the ground, thus leading to a natural damping and preventing the pilot from being projected back in the air; the shape is also fitting in the case of crash-landing, in which situation the legs can be designed to absorb a maximum of energy by braking progressively from the tip to their base.

Within one embodiment (FIG. 1), the frame includes ducted fans that are to be used together with the thrust assemblies. In this case, the ducted fans become part of the body. Also, within the preferred embodiment, a net is attached at the intake of each ducted fan. In that case, the top of the duct is perforated for that purpose, as described in FIG. 8. 80 represents holes drilled in the frame and 81 is a safety net.

Detailed Description of the Propulsion Means

In FIG. 3, FIG. 4 and FIG. 5, the parts described by 34, 47, 57 refer to the right side propulsion means and 35, 48, 58 to the left side propulsion means.

The propulsion means presented here exemplify specific implementations and their description is not intended to limit in any way the scope of the invention. As technology evolves, it would be within the reach of a person skilled in the art to implement a thrust assembly up-to-date with the latest, most powerful, efficient, and light technologies.

Figure 9:
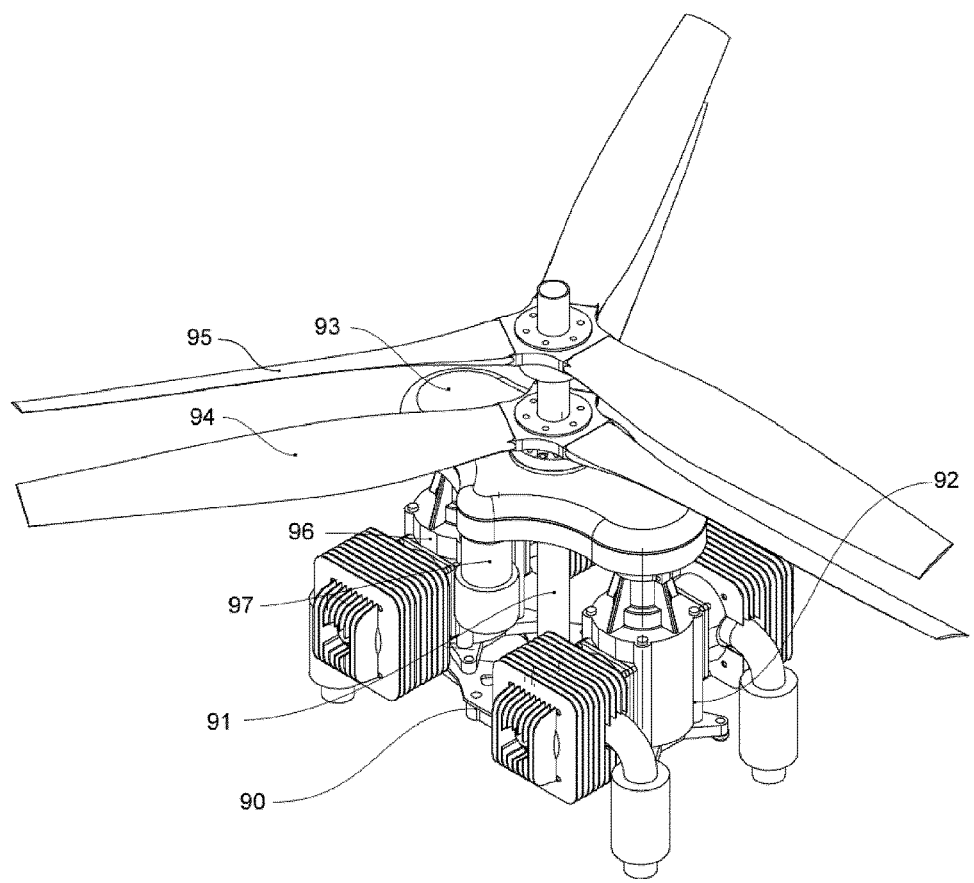
FIG. 9 presents a propulsion system embodiment with two geared engines.
Figure 10:
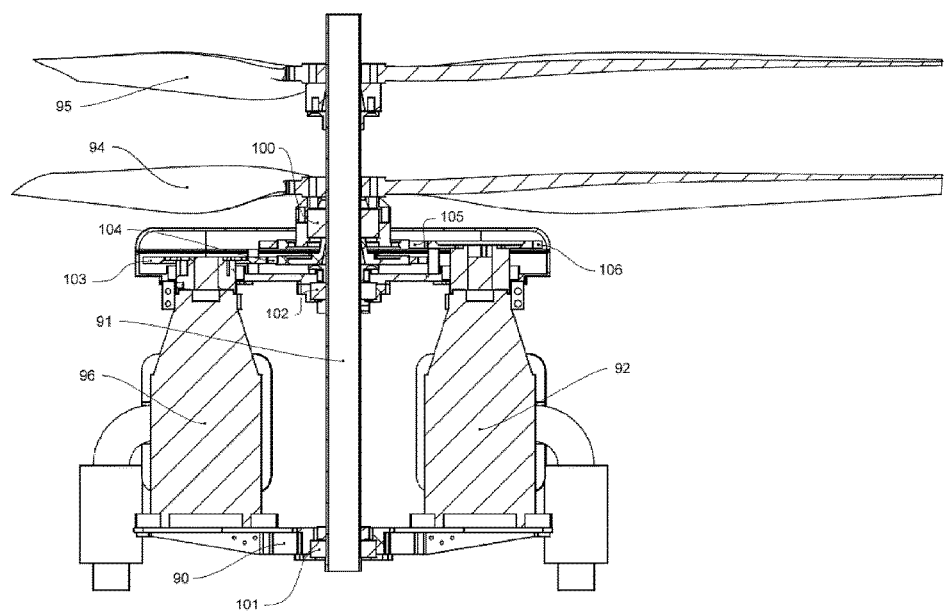
FIG. 10 presents an assembly of propulsion systems with two geared engines as a sectional view.

One implementation of the propulsion systems on one side of the vehicle is a dual gas engine geared co-axial, dual propeller redundant system, as described in FIG. 9 in an isometric view or in FIG. 10 in a sectional view, meeting the unique requirements for this specific application.

The assembly is composed of 3 sub-assemblies:
a) the engines (92 and 96) and connecting plates (90 and 93, 93 being at the same time a gearbox);
b) the gear systems (103, 104, 105, 106) and shaft 91; and
c) the counter-rotating propellers sets (94, 95).

2 engines, (92 and 96), are placed on either side of the central axis, each running in the direction opposite the other. They are connected by a connecting plate (90) and an upper-connecting plate (93), that also serves as a gearbox.

The gear systems used as reduction gearboxes are spur gears. Details about the gearbox are presented in FIG. 11. Note that both reduction gearboxes are independent and superposed on 2 distinct constant-height planes. Independent rotation of the 2 central gears (104 and 105) is obtained by isolating the gear (105) from the shaft's (91) rotation trough bearing (100), allowing the gears (104) and (105) to rotate in 2 opposite directions. The shaft itself is supported through bearings (101 and 102), in turn attached to a connecting plate (90) and upper gearbox (93). Of course, gear oil is used for lubrication, and spur gears can be replaced with helical gears or herringbone gears. A starter (97) is used to start the engines. A sliding element (1 12) may be used to sequentially connect the starter (97) to the upper gear 105 in order to start engine 92, and then connect it to gear 104 in order to start engine 96. Once both engines are started, the sliding element may return to its retracted position.

Propeller mount areas (1 10 and 1 1 1) provides propeller mounts for the two sets of propellers 94 and 95. Propeller mount area 1 10 is attached to exterior of bearing (100); Propeller mount area 1 1 1 is installed directly on the shaft, providing mounts for the second set of propellers (95).

For optimal cooling, it is necessary to guide airflow through the engine's cooling fins. This can be achieved using baffling.

Moreover, the engines' intake can be favorably equipped with an electrically-controlled valve that closes in case the emergency shutoff procedure is engaged. The first function of the valve is therefore to prevent liquids from entering the engine intake.

This engine assembly presents advantageous characteristics for our specific usage:

Redundancy: Each propeller set, given that the corresponding reduction gearbox mechanisms and engines are independent of each-other, enable the system to provide half the power in case of an engine failure, this corresponds to more than 50% of nominal thrust, disc loading being inferior in that case. In turn, this allows vehicles to be designed in a way that permits emergency landing with only 3 out of 4 engines running, or even 2 out of 4, as long as failures do not occur on the same side.

Another advantage of this assembly is the fact that gyroscopic effects can be completely cancelled out: Given that the 2 propeller sets and engines rotate in 2 opposite directions, the gyroscopic effects due to high speed rotation cancel out. Therefore, changing the thrust direction does not present side effects, behaves in a similar fashion at all rpm velocities and does not generate additional stresses through the frame.

Yet another upside of this assembly is the ability to increase the engine's rpm; higher rpms allow the usage of smaller engines and a higher power-to-weight ratio.

However, special care has to be taken into consideration when designing such an assembly. One important factor to take into consideration is bearings side-load and central-shaft load; in our design, bearing (100) is an angular contact bearing. Gyroscopic forces are not present outside of the assembly, but they are stressing the main shaft nonetheless. The whole assembly not having a gyroscopic effect, it is possible to change the direction of the assembly quickly and without resistance. The pilot may not be aware that a quick change in thrust direction stresses the main shaft, and main shaft failure would be catastrophic. For that reason, the main shaft has to be designed with a large safety factor over worst-case usage scenario.

Figure 12:
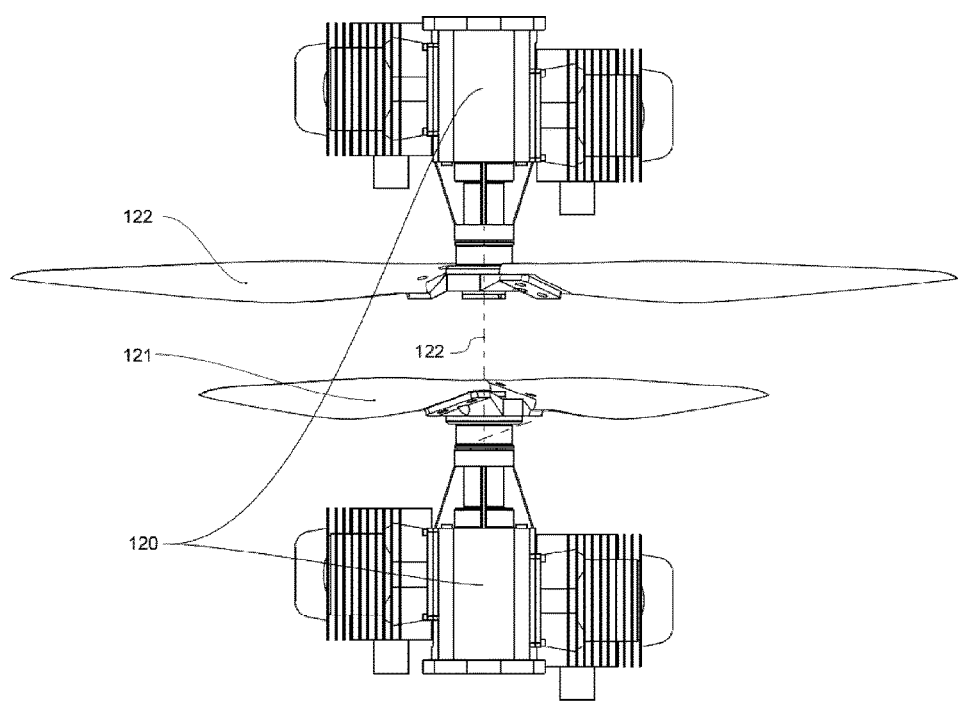
FIG. 12 presents another embodiment of the propulsion system using dual superposed engines.

An alternative embodiment of the propulsion systems on one side of the vehicle is described in FIG. 12. It consists of 2 engines (120) with propellers attached directly on their shafts, but placed one on top of the other. By placing the top engine upside down, we allow it to rotate in the same direction as the other engine. Both propeller sets stay coaxial, turning around axis (102) in opposite directions. The advantages of this embodiment are: increased reliability due to the reduced number of moving parts, reduced size, and zero gyroscopic effect. The downsides of this embodiment are: lower thrust efficiency, lower maximal hover thrust, as well as the inability to use the engines at their maximum power rating given that the blades would only reach sub-optimal tip velocities.

Yet another embodiment of the propulsion systems on one side of the vehicle is using opposed, electric engines mounted back-to-back in a counter-rotating propeller configuration.

In yet another embodiment, the propulsion systems on one side of the vehicle is composed of one single ducted fan assembly with a single propeller. The downside of this design is that each independent propulsion systems on one side of the vehicle has a non-zero gyroscopic effect; however, it making the propeller on the right side rotate the opposite way compared to the one on the other side cancels out the gyroscopic effect and the whole vehicle has zero gyroscopic effect. However, gyroscopic forces generate torques within the frame, and in case of a roll movement (leaning on the right or left side of the pilot), they will interfere with the torsion force generated by the pilot's feet.

Figure 13:
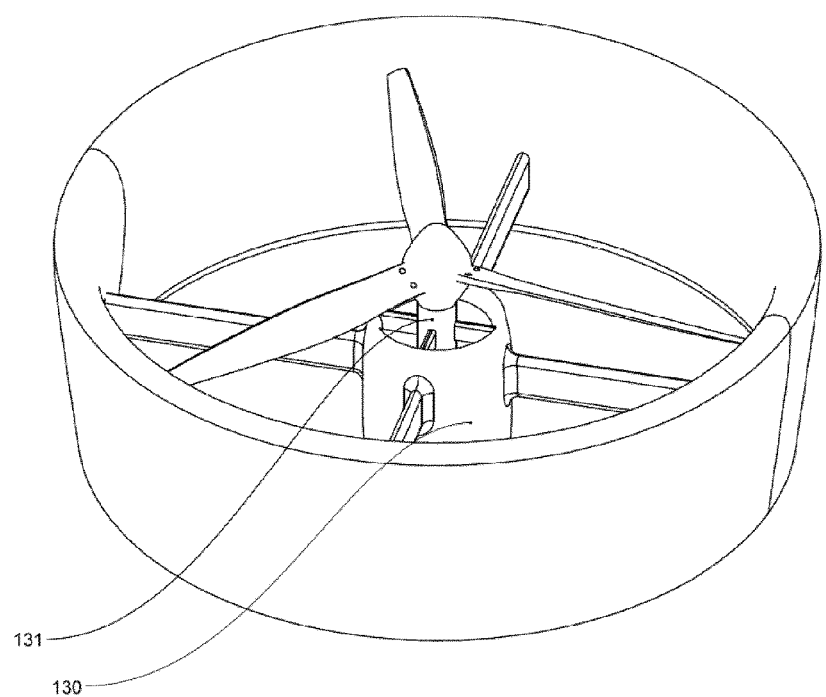
FIG. 13 presents another embodiment of the propulsion system using a turbine powered fan.

Yet another embodiment of the propulsion system on one side of the vehicle is described in FIG. 13. It presents a turbine (130)-powered ducted fan. The dimensions of the turbine in our case being much smaller than the duct's size, a reduction gearbox (131) has to be used. Using the gearbox to reverse the rotation direction of the turbine's rotating parts minimizes the gyroscopic effect. The advantages of such a thrust system are: its low size, low weight and reliability, whereas the downsides are its costs and lower efficiency at this scale given current turbine technologies at these dimensions.

Yet another embodiment of the propulsion systems on one side of the vehicle set is composed of multiple brushless electric motors with fixed pitch propellers set in a multi-copter configuration, as described in FIG. 4 and FIG. 5. When used within a multi-copter configuration, the motor/propeller sets are separated into 2 groups (47, 57, 48, and 58) and the rotation direction is chosen in order to cancel the gyroscopic effect within each group.

Moreover, if the vehicle is also intended to be remote-controlled, more constraints are to be set on the directions of rotation. In order to generate a torque around the Z-axis by the modulation of the propellers' angular velocities, and to make the vehicle turn counter-clockwise, for example, it is necessary to increase the power on the propellers rotating clockwise and lower the power on those rotating counter-clockwise. The propellers' rotation angle can be chosen in a way such that this process does not have other side effects (such as shifting the resulting thrust vector away from the center of the vehicle).

Figure 22:
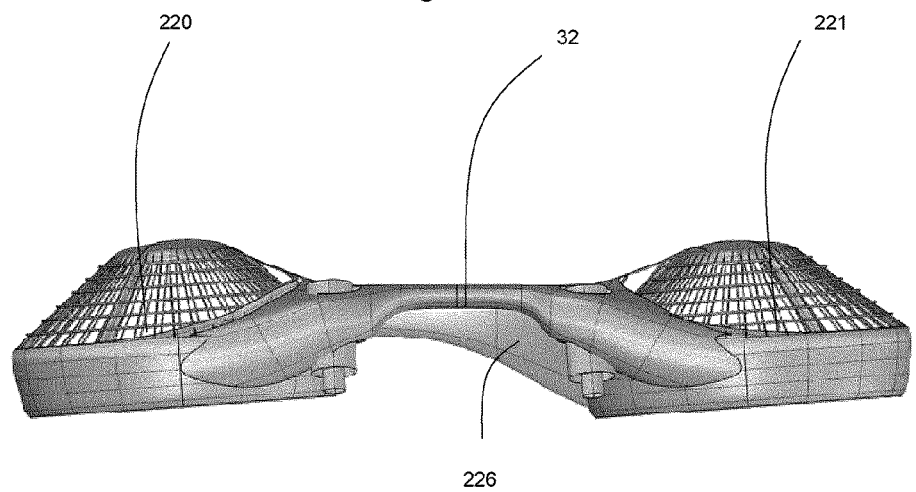
FIG. 22 presents a side view of another multi-ducted fan embodiment.
Figure 23:
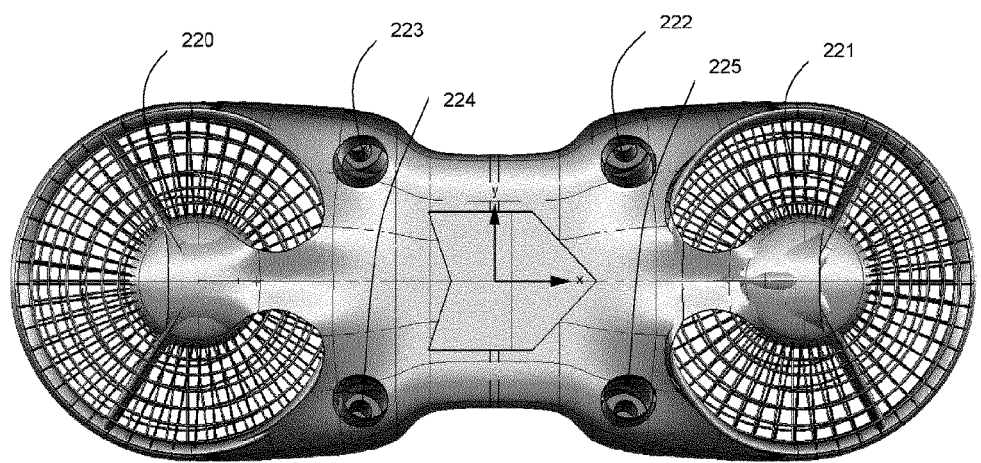
FIG. 23 presents a top view of another multi-ducted fan embodiment.
Figure 24:
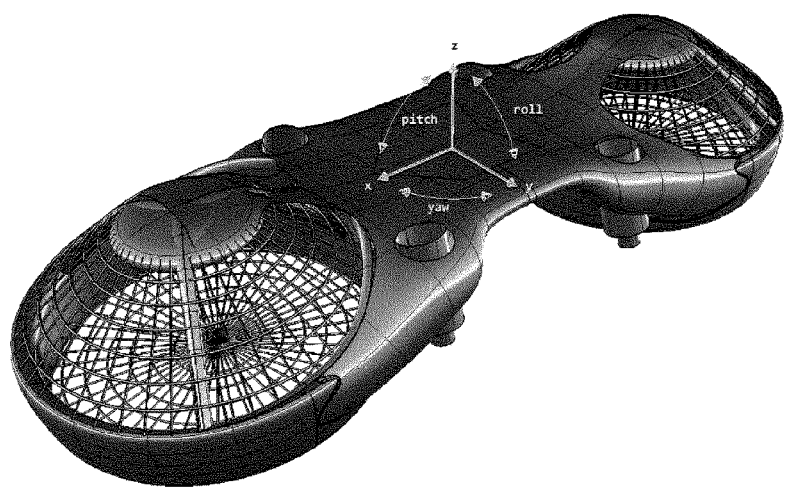
FIG. 24 presents a perspective view of another multi-ducted fan embodiment.

In yet another embodiment illustrated in FIGS. 22 to 24, the propulsion systems on one side of the vehicle are composed of:
a) One high-power ducted fan used as main source of lift.
b) Two (smaller) control ducted fans used for control and stabilization.

For a total of 2 lift ducted fans and 4 control ducted fans

For this embodiment, one can use a coordinate system centered on the center of the vehicle as described in FIG. 23.

Let Dmain be the distance from the center of the ducted fan to the center of the vehicle, in the range of 55 to 80 cm.

Let Dcontrolx be the distance from the center of one of the control ducted fans to the center of the vehicle about the X axis, in the range 25-35 cm.

Let Dcontroly be the distance from the center of one of the control ducted fans to the center of the vehicle about the Y axis, in the range 25-35 cm.

It is possible to tilt all the ducted fans towards the front (positive X) part of the aircraft. Let aTilt be that angle, in the range 0 to 10 degrees. This tilting allows the aircraft to move towards the front when it is perfectly leveled.

Let aControl be another tilt angle, applied to the control fans, in the range 20 to 45 degrees.

Table (12) describes the positions and orientations of the ducted fans.

TABLE 12

| Description | Id | Position | Orientation |
|---|---|---|---|
| High power ducted fan | 220 | (Dmain, 0, 0) | (0, sin(aTilt), cos(aTilt)) |
| High power ducted fan | 221 | (−Dmain, 0, 0) | (0, sin(aTilt), cos(aTilt)) |
| Control ducted fan | 222 | (Dcontrolx, Dcontroly, 0) | (sin(aCtl), −sin(aTilt), cos(aTilt) * cos(aCtl)) |
| Control ducted fan | 223 | (−Dcontrolx, Dcontroly, 0) | (sin(aCtl), −sin(aTilt), cos(aTilt) * cos(aCtl)) |
| Control ducted fan | 224 | (−Dcontrolx, −Dcontroly, 0) | (sin(aCtl), sin(aTilt), cos(aTilt) * cos(aCtl)) |
| Control ducted fan | 225 | (Dcontrolx, −Dcontroly, 0) | (sin(aCtl), sin(aTilt), cos(aTilt) * cos(aCtl)) |

Placing the small ducted fans this way allows us to create a torque around X, Y or Z axis by modulating the outputs on each of the 4 control ducted fans, using control configurations from Table (13).

TABLE 13

| Config | 221 | 222 | 223 | 224 | Torque vect. |
|---|---|---|---|---|---|
| C0 | + | − | + | − | (0, 0, 1) |
| C1 | − | + | − | + | (0, 0, −1) |
| C2 | + | + | − | − | (1, 0, 0) |
| C3 | − | − | + | + | (−1, 0, 0) |
| C4 | + | − | − | + | (0, 1, 0) |
| C5 | − | + | + | − | (0, −1, 0) |

Comments applicable to all configurations:

Depending on the application, the propellers can be ducted. Moreover, propulsion means can be optimized for low velocity (less than 100 km/h displacement velocity along the axis of the propulsion systems) or high velocity (more than 100 km/h displacement velocity along the axis of the propulsion systems.)

Propulsion systems that provide more than 50% of the static thrust at 100 km/h displacement velocity along the axis of the propulsion systems are considered to be high-velocity capable.

One possible way of attaining high performance hovering as well as high-velocity capability is through the usage of variable pitch propellers; this applies to all propeller based propulsion systems.

Detailed Description of the Controller and Optional Display

The following detailed description of the controller is that of the best mode or modes of the invention presently contemplated. Such description is not intended to be understood in a limiting sense. Can other future controller-related inventions be presented, whether they be physical or hands-free control devices, it would be within the knowledge of a person skilled in the art to integrate such alternative control systems within the vehicle.

Figure 14:
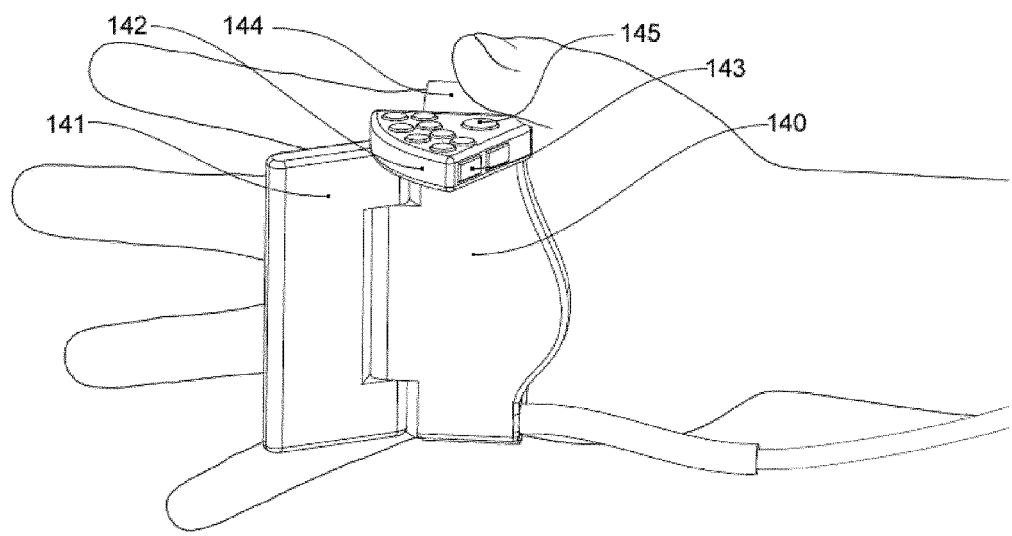
FIG. 14 presents a controller embodiment being attached to a hand.
Figure 15:
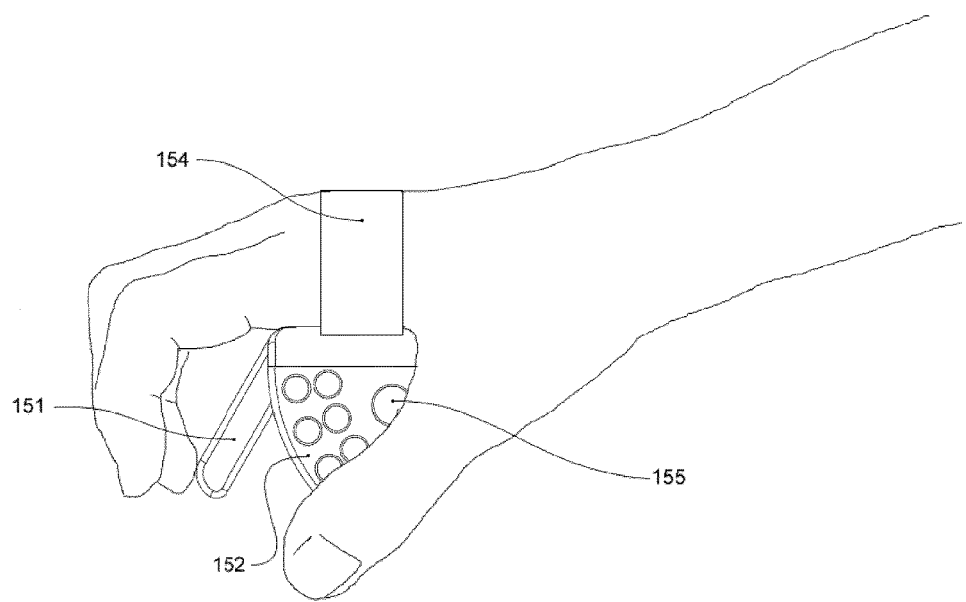
FIG. 15 presents a controller embodiment with a hand pressing on it.

In the preferred embodiment, the controller is a hand-held device attached through a wire to the vehicle as seen in FIG. 14. It contains a rotating part, where the accelerator (141) can be rotated by the grasping movement of the pilot's hand. A spring allows the accelerator to rotate back into its idle position in case the pilot stops exerting a pressure on it. The rotation of plate (141) relatively to plate (140) can be measured using a potentiometer or using a magnetic angular position sensor. The hand-held device is equipped with an extrusion (142) placed under the pilot's thumb, and buttons on it allow him or her to have additional control over the vehicle. The buttons placed on this extrusion are motor-starting buttons for each motor, emergency stop buttons for each motor, and emergency stop (145) for all motors.

Optionally, the controller has a friction button that locks the controller at the current thrust level by pressing a button (143) on the side of the extrusion (142).

Figure 16:
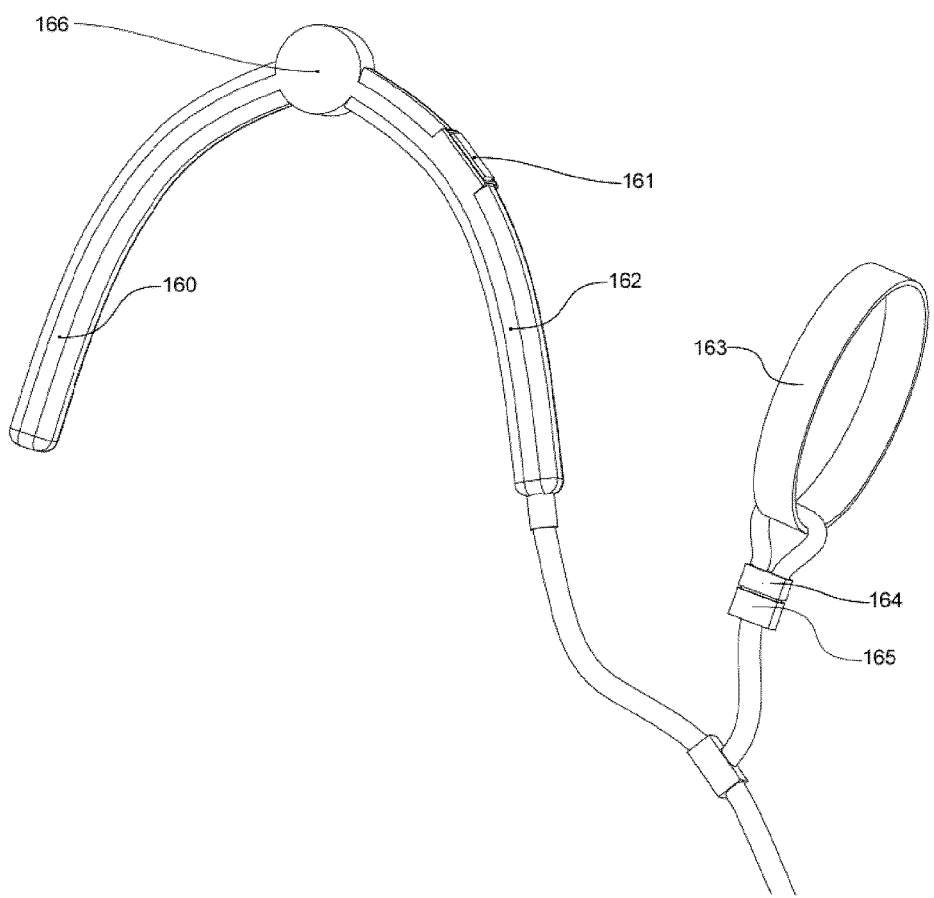
FIG. 16 presents another embodiment of a controller.
Figure 17:
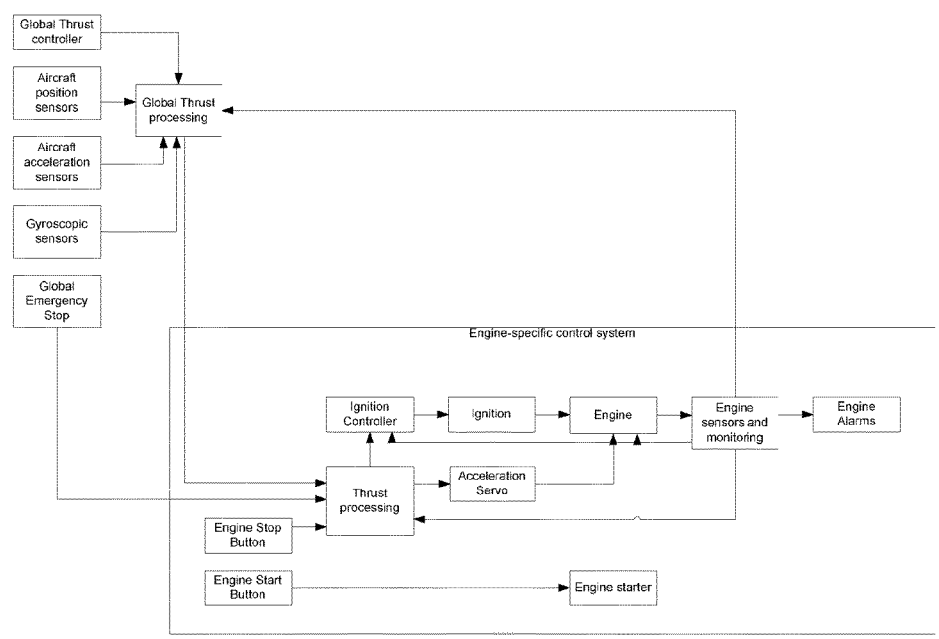
FIG. 17 presents a diagram view of a control system.
Figure 18:
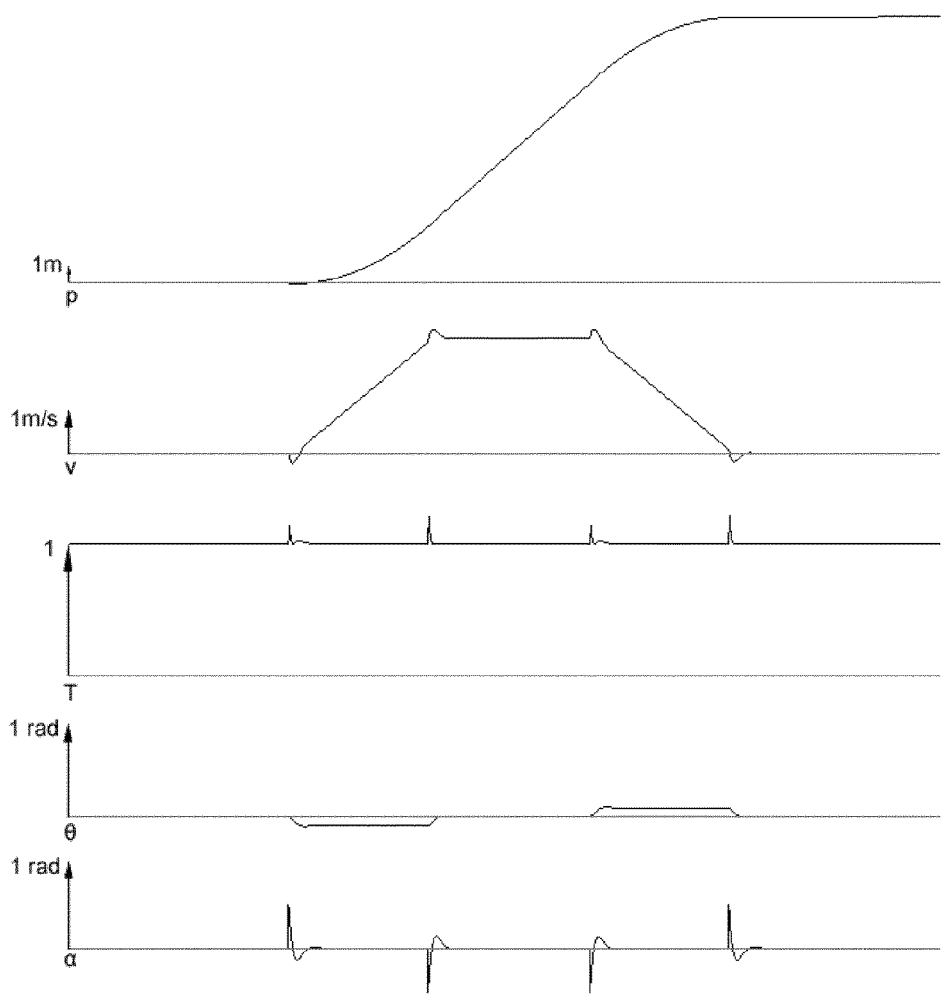
FIG. 18 presents simulation results, annotated as curves in order to display the position orientation, thrust intensity, and control angles as a function of time.

In another embodiment presented in FIG. 16, the controller is a pliers-type hand-held device. Like certain pliers, it uses a spring to allow the pliers to return to their open position automatically. In this embodiment, the controller is composed of:

- 2 main solid parts (160 and 162), handles shaped like 2 bent arms, capable of rotating around a pivoting mechanism (166). The angle between the 2 solid parts can be measured using a potentiometer or using a magnetic angular position sensor;
- at least one control button (161), in most cases intended as the emergency stop button; and
- optionally, a safety bracelet (163) attached to connectors (165), and which can be worn by the pilot.

In addition to the presented embodiments, a display along with a computerized system indicating information useful to the pilot, including but not limited to the vehicle's status, position, information and, possibly, topological information about the environment surrounding the vehicle, information about positioning and risks associated with nearby vehicles, alarms, as well as readings of various sensors. This display may be part of the controller, may be attached to the user's forearm or may be integrated within the pilot's glasses or helmet.

Detailed Description of Preferred Embodiments Regarding Safety Devices

The following descriptions present systems that are intended to augment the safety of the vehicle.

One embodiment of such a system is a safety bracelet as described on the right side of FIG. 16. The bracelet is composed of a flexible part (163), an electrical connector (164) and a corresponding connector (165). A monitoring system validating that connector (164) is plugged into connector (165); a failure in this validation prevents the engines from running, therefore preventing unintended acceleration when the pilot does not hold the controller in his or her hand.

Figure 8:
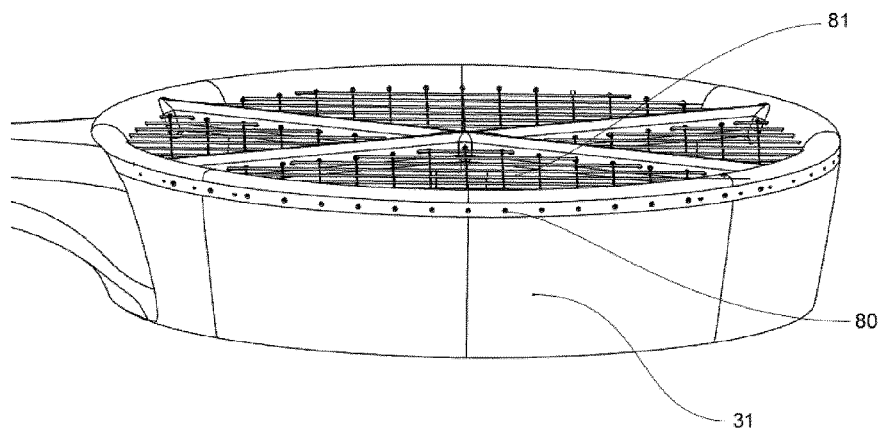
FIG. 8 presents a close-up view of a one-ducted fan, showcasing a safety net.

Yet another embodiment of such a system is a net, placed at the propeller's duct entrance, as is shown in FIG. 8; it prevents the pilot, birds or any other debris from touching the high speed rotating blades. The net (81) is attached using dedicated drilled holes (80) integrated within the frame.

Furthermore, another embodiment of such a system is a height sensor, which, in combination with software and the central computer, acts as a height limitation device, thus preventing the machine from exceeding a certain height above the ground.

Furthermore, another embodiment of such a system is a quick-detach structure allowing the pilot to quickly detach from the platform based assembly in case of an emergency.

Furthermore, another embodiment of such a system is a parachute or a ballistic parachute which the pilot can carry in order to aid him or her in case of any vehicle failure; however, the usage of such equipment is limited to altitudes that permit a safe deployment.

Furthermore, another embodiment of a safety device is the addition of headlights and/or navigation lights that may or may not be of the strobe light type, increasing the visibility of the vehicle, for example during nighttime flights, and helping the pilot perceive the environment.

Furthermore, in another embodiment of such a system, the bindings fastening the pilot's boots to the frame incorporate a presence sensor that is only activated when a boot is strapped in. These sensors are connected to the central computer and prevent the machine from being activated when no boot is attached to the binding.

Finally, in yet another embodiment of the invention, the vehicle comprises a collision detection device capable of predicting collisions with static solids or moving objects.

Description of Manufacturing Methods

The vehicle is built using industry standard methods. These methods include:

a) carbon fiber industry standard methods. They include the usage of vacuum bagging;
b) carbon fiber bonding using industry standard bonding agents;
c) production of metal parts using CNC machining. The CNC machines can have 3,4 or 5 axes;
d) production of metal parts using industry standard methods; and
e) assembly of the vehicle using industry standard methods.

Description of Methods for Using the Vehicle

The pilot secures his or her feet to the attachment areas, engages at least parts of the propulsion means, takes off by increasing the propulsion intensity and flies the vehicle, exerting control over the spatial positioning through the power of the propulsion means and by the displacement of his or her body respective to the vehicle. Balance control is achieved using the pilot's own reflexes and feet to stabilize the vehicle. Propulsion intensity is regulated using the hand-controller.

Balance control (achieving balance on the vehicle): in one example, if the pilot is leaning towards the front of the vehicle (as in FIG. 2) and wants to regain an upright position, he or she can apply pressure at an angle a where the platform based assembly is rotated clockwise compared to its default position for a certain period of time. This will generate an angular acceleration, making him roll towards the upright position. However, before the upright position is reached, the pilot can apply force at an opposite angle a, allowing him or her to reach the upright position without continuing to roll towards the back.

This method uses reflexes similar to the ones we already use in order to stand up.

During learning, it is possible that the pilot overreacts, generating an oscillation. This effect can also be present in the case of the bindings with the vehicle not being secured enough. It is also important to note that standing balance-control quickly becomes intuitive and, once the reflexes are formed, reliable and precise control of the vehicle can easily be achieved.

High speed flight: If the vehicle has been designed for high-velocity flight, the pilot can lean forward and go from his or her standing (vertical) position to an approximately horizontal position. In this case, aerodynamic forces on the pilot provide lift and the propulsion means are used for lateral displacement. For landing, the pilot can lean back to his or her vertical position. Moreover, the pilot can wear equipment that improves his or her aerodynamics and lift coefficients.

The method for flying the vehicle may comprise:

a) a pre-flight checklist related to the vehicle: controller check (full travel), controller check (friction on), energy source check, motor check, batteries check, generator check, electronics check, ignition switch check;
b) pre-flight procedures related to the vehicle: strap-in, engine startup; and c) take-off procedure related to the vehicle: Clearance check.

Landing procedure depends on landing surface:

Solid-leveled ground: Slowly reduce thrust until contact. Minimize impact by accelerating just before touchdown.

Non-leveled ground: Use lateral acceleration to match the landing surface's angle, and approach the landing area upwards from the area that is deeper. When touchdown occurs, use the emergency stop button to quickly shut off all engines.

Water-landing: At the recommended height above water, which is in the range of 1.5 to 5 meters below water surface (depending on the velocity rate at which the propellers can be stopped), use emergency stop button to shut down all engines and decelerate the propellers as quickly as possible. This will initiate free fall. Once in the water, un-strap from the vehicle.

Emergency procedures: If a propulsion system on one side of the vehicle is partially failing, the center of mass of the vehicle has to be moved further away from the faulty thrust assembly. In case of unrecoverable power failure, initiate usage of the emergency shutdown button and deployment of the parachute.

Training procedures: A training procedure for inexperienced pilots occurs in a setup where the pilot and the vehicle are secured by a rope at a safe distance above the ground. This training procedure includes the usage of a rope tensioning mechanism that prevents the rope from becoming loose, thus avoiding the risk of being aspirated by the propulsion means. Using this scenario, the pilot learns to balance the vehicle in a safe environment.

In order to achieve this training procedure, the pilot has to follow these steps:

a) The pilot puts a harness on;
b) The pilot fastens his or her feet to the vehicle, performing preflight checklist;
c) The pilot attaches the rope to his or her harness;
d) The pilot is lifted in the air by pulling onto the rope and locking it in a position safe below ground level;
e) The pilot starts the propulsion means. He slowly increases the thrust intensity until he is able to lift the platform based assembly above the rope's equilibrium height. He attempts to achieve hovering; however, can he lose control of the vehicle, he can decrease the thrust intensity to its minimum, or, optionally, use the emergency stop button to turn off the vehicle; and
f) The pilot turns off the vehicle, falls and is left hanging on the rope.

Learning methods include training in emergency situations, such as those situations in which one or more propulsion systems are intentionally kept off.

Description of Usages of the Vehicle

The vehicle can be used for the following, as well as other, purposes:

a) flying from point A to point B,
b) usage as emergency vehicle allowing rescue teams to reach hardly accessible areas; and
c) usages of the vehicle for surveillance and military applications.

Example 1: Octocopter Implementation of the Vehicle

FIG. 5 presents an electric octo-copter implementation of the invention. The vehicle is built according to the general description of the invention and to the detailed description of the preferred embodiments, considering that an un-ducted electrical propeller based solution is adopted. In this case, the vehicle consists of:

A Carbon-fiber Frame

Figure 19:
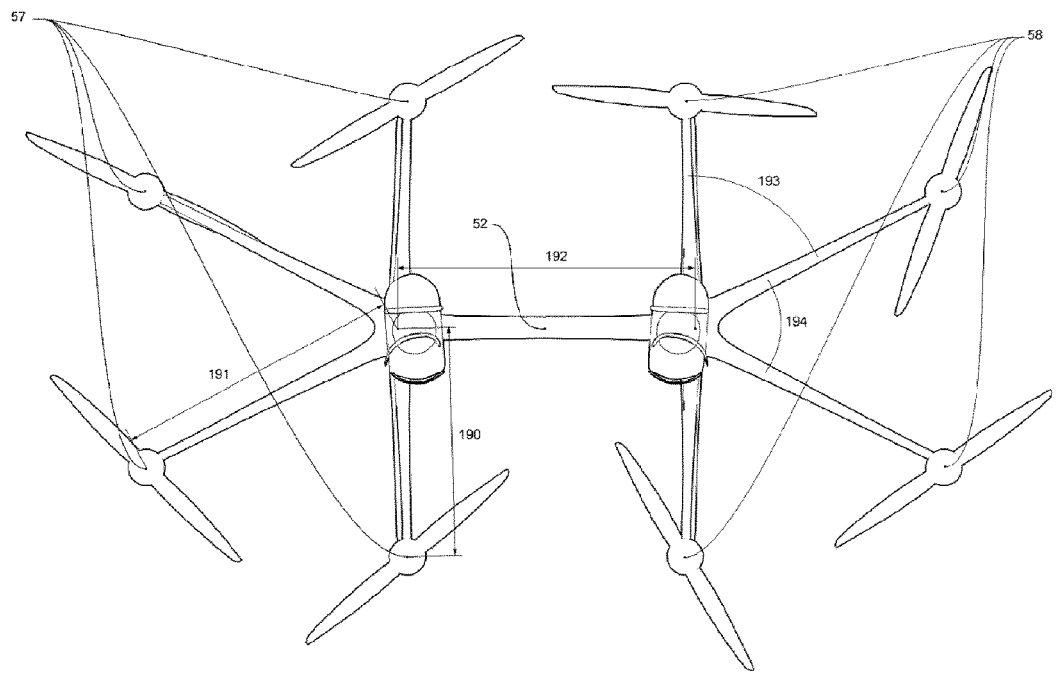
FIG. 19 presents a top view of an octo-copter embodiment.

The frame has a shape described in FIG. 19 and wherein:
(190), the length of the small motor arms is in the range of 0.5 m to 0.75 m;
(191), the length of the long motor arms is in the range of 0.6 m to 0.9 m;
(192), the length of the flexible link between attachment areas 15 and 16 is in the range of 0.5 m to 0.75 m, with a torsion elastic modulus ranging from 100 Nm/rad to 1000 Nm/rad;
(194), the angle between the 2 long motor arms ranges from 45 to 60 degrees;
(193), the angle between the one long motor arm and a short one is in the range of 55 to 70 degrees;
the height of the vehicle is in the range of 0.3 to 0.5 m;
the square delimited by the tips of the landing arms in the X direction (192) is in the range of 0.5 m to 0.75 m; it is in the range of 0.8 m to 1.2 m in the Y direction;
the frame is built using an internal mold of polystyrene foam that has been CNC machined to follow the plans in FIG. 5. Each arm has a conical shape that is thicker towards the attachment area. Two bi-directional carbon fiber layers are applied on the whole frame and pressed until properly cured. If necessary, the frame can be divided into smaller parts and fused by a bonding agent; and
the frame's central part has a section shaped as described in FIG. 6 with 4 fins protruding internally (62).

Propulsion Means and Energy Source

The motors to be used are brushless electric motors capable of sustaining at least 4000 W at 6000 RPM for the flight duration, preferably with a shaft diameter of at least 10 mm. Propellers are lightweight carbon-fiber propellers designed for electric motors, 59 cm long. The recommended rotation direction is to make all the propellers in front of the pilot turn one way, all the ones behind him in the opposite direction. Individual thrust tests for a motor-propeller assembly can be no less than 130 N. That totals 1040 N thrust. Each motor cannot weight more than 1 kg.

Batteries used for this implementation were of lithium-polymer type, of 10 S 5000 mAh type, one for each motor. The weight of all the batteries can be about 12.5 kg.

Using these specifications, the vehicle's total weight is approximately 28 kg. The pilot that flies such an vehicle cannot weigh more than 65 kg. Flight tests have been achieved with a pilot measuring 1.8 m.

Controller

In this case, the controller used has a pliers-type shape and is described in FIG. 16. A potentiometer placed in the pivoting part (166) senses the angle between the rotating parts (160 and 162), and is monitored by a central computer onboard. The thrust intensity is forwarded to 8 brushless engine controllers, each controlling one engine.

Flight and Method of Control

Multiple flights have been achieved using the described octo-copter implementation. Learning has been achieved using learning methods in the "Description of methods for using the vehicle" section. Stable takeoff, flight and water-landing has been accomplished. The total flight time was of 52 seconds with a total traveled distance of approximately 40 m.

Example 2: Dual Ducted-Fan Implementation of the Vehicle

Figure 20:
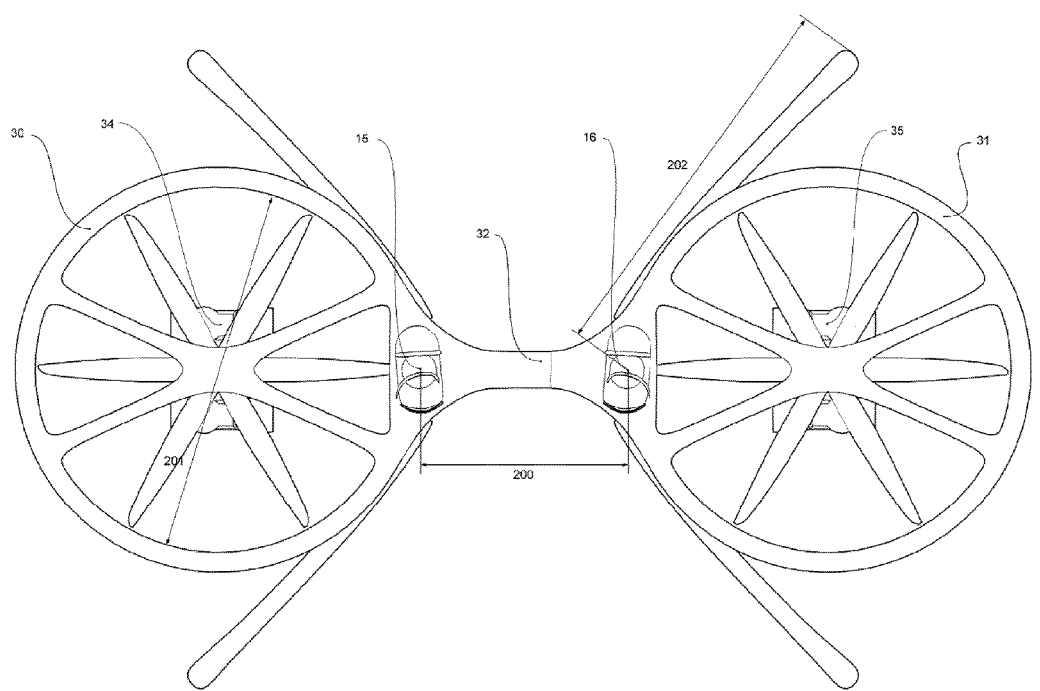
FIG. 20 presents a top view of a dual-ducted fan embodiment.
Figure 21:
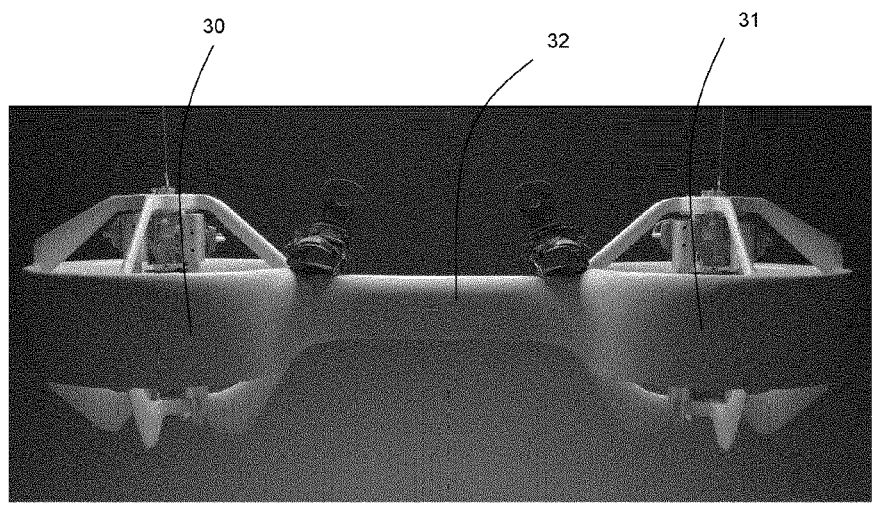
FIG. 21 presents a front view of another dual-ducted fan embodiment.

FIG. 3, FIG. 20 and FIG. 21 present a dual ducted-fan implementation of the invention. The vehicle is to be built according to the general description of the invention and to the detailed description of the preferred embodiments, considering that two ducted fans are used as the propulsion means. Moreover, each ducted fan has 2 sets of counter-rotating propellers, each set of propellers being powered by its dedicated motor; the motors are reciprocal combustion engines. In this case, the aircraft consists of a carbon fiber frame (30,31, 32).

The frame has a shape described in FIG. 3 and also in FIG. 20 or 21 wherein:
- the duct internal diameter (201) is in the range of 0.6 to 1.2 m;
- the length of the flexible link (200) between attachment areas 15 and 16, ranges from 0.5 m to 0.75 m;
- the height of the vehicle is in the range of 0.4 m to 0.8 m; and
- the landing arms have a projected length onto the platform based assembly's plane of 0.7 to 1.1 m, and are describing a rectangle on the ground of at least 0.6 m by 0.6 m.

The frame is shaped as 2 short and wide ducts (oriented with their axis vertically) (30 and 31), their height-to-width ratio being lower than 1, connected with a connecting link (32). The connecting rod has a section as described in FIG. 6 containing an exterior shell (61) with 4 internal protruding fins (62), and a torsion elastic modulus in the range of 100 Nm/rad to 1000 Nm/rad. The frame also contains 4 outward-bent landing arms (33); these arms are the only part in contact with the ground in normal use.

Each ducted fan is equipped with diametric crossing arms creating an attachment region for the propulsion means (34). The crossing arms have an X shape, are present at the exit of the duct, and can optionally be placed at the entrance of the duct as well. The placement of crossing arms at the entrance of the duct allows a stiffer installation of the optional entrance net (81), attached through an array of holes (80).

Areas 15 and 16 are designed with 4 bolts built into the frame, allowing bindings to be attached to the frame. Standard adjustment mechanisms that allow, for example, the adjustment of the binding orientation are optional.

Propulsion Means and Energy Source

Figure 11:
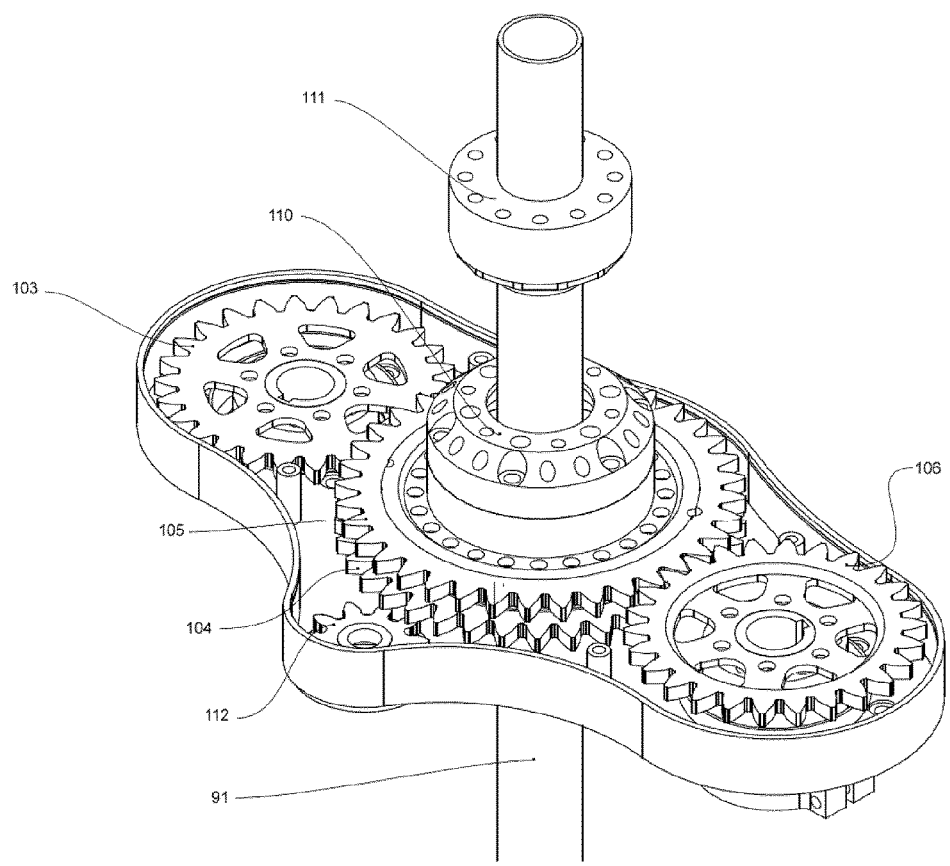
FIG. 11 details the propulsion system gearbox of the propulsion system, without the cover.

The propulsion systems used within this implementation are described in FIG. 9, FIG. 10 and FIG. 11. Each duct is equipped with 2 sets of counter-rotating propellers (94 and 95), each of which is powered using its own combustion engine (92 and 96), delivering power to a reduction gearbox (93). Propellers (94 and 95) with different pitch can be used, allowing both optimization of the propulsion systems on one side of the vehicle for hovering or for high speed flight. Moreover, this design provides zero gyroscopic effects in normal use, and redundancy (with some gyroscopic effects) in case of emergency. The total engine power in this implementation is about 60 KW.

Controller

The controller used within this implementation is the one described in FIG. 14, using 2 pivoting mechanical parts (141 and 142) and being attached to the pilot's hand through a strap-type attachment (144).

Flight Method and Control

The method to be used for flying this implementation of the vehicle is the one described in the Methods for Using the Vehicle section.

Example 3: Board-Shape Implementation of the Vehicle

FIGS. 22, 23 and 24 present an implementation of the invention using a total of 6 ducted fans. The shape of the vehicle in this implementation resembles a board, more specifically, it is a rounded-rectangular shape vehicle, where its shape about the X-Y axis is a rounded rectangle with an aspect ratio of about 2.5 to 1, longer towards the X axis, and where the dimension of the board about the Z axis is significantly lower than about the X or Y axis, in this case, $\frac{1}{2}^{th}$ of the dimension about the Y axis.

The propulsion systems are arranged as follows:
- a)—Two main high power ducted fans (220 and 221);
- b)—Four control ducted fans (222, 223, 224, and 225);

The 3D coordinates as well as 3D pointing direction of each ducted fan are described in the Table (12)

This embodiment is intended for low altitude (0-3 m) flight in hover mode, with limited height and limited maximum velocity. It does not contain any location where the feet should be attached to the vehicle, and users can jump off/on the platform.

Power Source

This design preferably uses both batteries and gasoline. Batteries are used to power the 4 smaller (control) ducted fans, and gasoline is used to power the larger main fans.

Control System

All fans are controlled by a central processing unit.

The distance to ground in the Z direction, called H, is measured using a set of sonars. In case sonars are not able to properly measure the distance, the system relies on altimeter or GPS data.

The main ducted fans rotation speed can be adjusted in a predictable way to achieve a certain thrust, which is directed mainly towards the direction of the duct described in table (12). Let D be the direction, and $$F = D * F \qquad (14)$$

Where F is a scalar. Let Htarget be the target hover height, and H be the current hover height, both scalars.

Power on the main ducted fans is modulated to maintain a certain target distance to the ground, using a PD control system:

$$F = K0 + (H\text{target} - H) * Kp + VH * Kd \qquad (14)$$

Where K0, Kp and Kd can be adjusted. In the preferred embodiment, K0 is adjusted to compensate for the total weight of vehicle and pilot and where Kp and Kd are adjusted for critical or under-critical damping allowing the aircraft to return to Htarget if an external perturbation occurs without oscillations.

Additionally, a maximum velocity on the Z direction can be imposed by calculating $$F\max V = (\text{Clamp}(VH, VH\text{Min}, VH\text{Max}) - VH) * Ks \qquad (15)$$

Which, if it is added to F:

$$F\text{total} = F + F\max V \qquad (16)$$

Also, a PID controller can be used to achieve height control.

Preferably, power on the control fans is modulated in order to alter the orientation of the vehicle and make it converge towards a target orientation, and PD or PID control device is used for controlling the orientation of the vehicle.

Preferably, it is possible to create torque around each axis of the aircrafts using different power configurations on the control ducted fans. The torques associated with each power configuration are described in Table (13).

Preferably, target orientation is modulated to achieve standalone flight and locomotion without pilot in the XY plane.

Preferably, the orientation control device is set to behave in the following way:
a) When no pilot is present, its orientation is set to bring the vehicle to a non-moving zero-velocity state. The converging orientation, in case of no external wind, is an orientation where pitch=−4 degrees and a roll=0.
b) When a pilot is present, the orientation control is loosened, and only becomes active when the vehicle is oriented with yaw or roll beyond a certain interval.
c) When the vehicle's roll angle is modified, the control system applies a torque on the Z axis. This allows the pilot to control the aircraft's yaw angle by tilting the aircraft around the roll angles.

Note that in this case, the frame is rigid and the control of the aircraft does not necessitate twisting.

Preferably, the direction towards the positive X axis is the preferred displacement direction, making the vehicle have a "front" and a "back".

Using the described configuration and controller:
a) It is possible to alter vehicle's orientation sufficiently to make it move backwards.
b) When applying a roll to the vehicle, the vehicle begins a sideways movement because of the alignment of the ducted fans. However, the embedded controller applies a torque around the Z axis making the board turn with the front towards the movement's direction. In the end the vehicle ends up moving mainly towards its front direction.

It is also important to note that the underside of the vehicle contains a fin that increases drag towards the Y direction, and, also, its larger size towards the back of the vehicle generates a torque that also tends to align the front of the vehicle with the direction of movement.

Although the present invention has been described with the aid of specific embodiments, it can be understood that several variations and modifications may be grafted onto said embodiments and that the present invention encompasses such modifications, usages or adaptations of the present invention that will become known or conventional within the field of activity to which the present invention pertains, and which may be applied to the essential elements mentioned above.

What is claimed:

1. A personal flight vehicle for at least one free-standing pilot, comprising:
   (a) a frame on which the pilot stands, wherein said frame provides a surface area upon which the feet of the pilot are positionable;
   (b) a plurality of rotor-based propulsion systems connected to said frame, and wherein said propulsion systems generate a thrust towards a direction substantially perpendicular to a horizontal plane of the vehicle, with said thrust having a sufficient intensity to provide a maneuver of the pilot-embarked vehicle selected from the group consisting of: vertical take-off and landing, flight, and locomotion;
   (c) at least one propulsion system comprising a rotor that spins clockwise, and wherein at least one propulsion system comprising a rotor that spins counter-clockwise;
   (d) attachments for securing the feet of said pilot, said attachments being configured to keep said pilot attached to the vehicle and wherein the weight of the vehicle is low enough to allow said pilot's body movements to induce change in the spatial orientation of the vehicle which therefore changes said thrust direction resulting in the vehicle's said locomotion; and
   (e) a plurality of brushless electric motors, wherein each of said brushless electric motors are connected to at least one propeller; and
   wherein at least two of said electric motored propellers aim their thrust toward a direction different than a direction perpendicular to the horizontal plane of the vehicle.

2. The personal flight vehicle of claim 1, wherein said weight of the vehicle is less than a weight of an average person to enable said pilot's body movements to induce change in the spatial orientation of said vehicle.

3. A personal flight vehicle for a free-standing pilot, comprising:
   (a) a frame on which the pilot stands, wherein said frame provides a surface area upon which the feet of the pilot are positionable;
   (b) a plurality of rotor-based propulsion systems connected to said frame, and wherein said propulsion systems generate a thrust towards a direction substantially perpendicular to a horizontal plane of the vehicle, with said thrust having a sufficient intensity to provide a maneuver of the pilot-embarked vehicle selected from the group consisting of: vertical take-off and landing, flight, and locomotion;
   (c) at least one propulsion system comprising a rotor that spins clockwise, and wherein at least one propulsion system comprising a rotor that spins counter-clockwise;
   (d) attachments for securing the feet of said pilot, said attachments being configured to keep said pilot attached to the vehicle and wherein the weight of the vehicle is low enough to allow said pilot's body movements to induce change in the spatial orientation of the vehicle which therefore changes said thrust direction resulting in the vehicle's said locomotion;
   (e) a plurality of brushless electric motors, wherein each of said brushless electric motors are connected to at least one propeller; and
   (f) at least one internal combustion engine used as a source of power.

4. The personal flight vehicle of claim 3, wherein said weight of the vehicle is less than a weight of an average person to enable said pilot's body movements to induce change in the spatial orientation of said vehicle.

5. The personal flight vehicle of claim 3, wherein said propellers are fixed pitch.

6. The personal flight vehicle of claim 4, wherein said propellers are fixed pitch.

7. The personal flight vehicle of claim 3, wherein said propellers are variable pitch.

8. The personal flight vehicle of claim 4, wherein said propellers are variable pitch.

9. The personal flight vehicle of claim 3, wherein a shaft of at least one of said internal combustion engines is connected to at least one propeller.

10. The personal flight vehicle of claim 4, wherein a shaft of at least one of said internal combustion engines is connected to at least one propeller.

11. The personal flight vehicle of claim 5, wherein a shaft of at least one of said internal combustion engines is connected to at least one propeller.

12. The personal flight vehicle of claim 6, wherein a shaft of at least one of said internal combustion engines is connected to at least one propeller.

13. The personal flight vehicle of claim 7, wherein a shaft of at least one of said internal combustion engines is connected to at least one propeller.

14. The personal flight vehicle of claim 8, wherein a shaft of at least one of said internal combustion engines is connected to at least one propeller.

15. The personal flight vehicle of claim 3, wherein at least one of said internal combustion engines is operatively connected to at least one propeller.

16. The personal flight vehicle of claim 4, wherein at least one of said internal combustion engines is operatively connected to at least one propeller.

17. The personal flight vehicle of claim 5, wherein at least one of said internal combustion engines is operatively connected to at least one propeller.

18. The personal flight vehicle of claim 6, wherein at least one of said internal combustion engines is operatively connected to at least one propeller.

19. The personal flight vehicle of claim 7, wherein at least one of said internal combustion engines is operatively connected to at least one propeller.

20. The personal flight vehicle of claim 8, wherein at least one of said internal combustion engines is operatively connected to at least one propeller.

21. A personal flight vehicle for a free-standing pilot, comprising:
   (a) a frame on which the pilot stands, wherein said frame provides a surface area upon which the feet of the pilot are positionable;
   (b) a plurality of rotor-based propulsion systems connected to said frame, and wherein said propulsion systems generate a thrust towards a direction substantially perpendicular to a horizontal plane of the vehicle, with said thrust having a sufficient intensity to provide a maneuver of the pilot-embarked vehicle selected from the group consisting of: vertical take-off and landing, flight, and locomotion;
   (c) a plurality of brushless electric motors placed in a multi-copter configuration, and wherein said electric motors are each connected to a propeller, and wherein at least one propeller from at least one electric motor spins clockwise, and wherein at least one propeller from at least one electric motor spins counter-clockwise;
   (d) at least one battery that is operatively connected to a plurality of said electric motors;
   (e) attachments for securing the feet of said pilot, said attachments being configured to keep said pilot attached to the vehicle; and
   wherein the weight of the vehicle is low enough to allow said pilot's body movements to induce change in the spatial orientation of said vehicle which therefore changes said thrust direction resulting in the vehicle's said locomotion.

22. The personal flight vehicle of claim 21, wherein said weight of the vehicle is less than a weight of an average person to enable said pilot's body movements to induce change in the spatial orientation of said vehicle.

23. The personal flight vehicle of claim 21, wherein said propellers are fixed pitch.

24. The personal flight vehicle of claim 22, wherein said propellers are fixed pitch.

25. The personal flight vehicle of claim 21, wherein said propellers are variable pitch.

26. The personal flight vehicle of claim 22, wherein said propellers are variable pitch.

27. A personal flight vehicle for a free-standing pilot, comprising:
   (a) a frame on which the pilot stands, wherein said frame provides a surface area upon which the feet of the pilot are positionable;
   (b) a plurality of rotor-based propulsion systems connected to said frame, and wherein said propulsion systems generate a thrust towards a direction substantially perpendicular to a horizontal plane of the vehicle, with said thrust having a sufficient intensity to provide a maneuver of the pilot-embarked vehicle selected from the group consisting of: vertical take-off and landing, flight, and locomotion;
   (c) attachments for securing the feet of said pilot, said attachments being configured to keep said pilot attached to the personal flight vehicle; and
   wherein said attachments comprise an electronically controlled binding mechanism allowing the pilot to detach on command.

28. A personal flight vehicle for a free-standing pilot, comprising:
   (a) a frame on which the pilot stands, wherein said frame provides a surface area upon which the feet of the pilot are positionable;
   (b) a plurality of rotor-based propulsion systems connected to said frame, and wherein said propulsion systems generate a thrust towards a direction substantially perpendicular to a horizontal plane of the vehicle, with said thrust having a sufficient intensity to provide a maneuver of the pilot-embarked vehicle selected from the group consisting of: vertical take-off and landing, flight, and locomotion;
   (c) at least one sensor configured to detect a force applied by at least one part of at least one of the pilot's feet; and
   wherein the vehicle enters into an automated maneuver upon said detection of said force.

* * * * *